United States Patent
Wise et al.

(10) Patent No.: US 10,584,494 B2
(45) Date of Patent: Mar. 10, 2020

(54) ASPHALT BASED ROOFING MATERIAL WITH INCREASED INFRARED REFLECTIVITY

(71) Applicant: Owens Corning Intellectual Capital, LLC, Toledo, OH (US)

(72) Inventors: Christina Marie Wise, Granville, OH (US); Bert W. Elliott, Ottawa Hills, OH (US)

(73) Assignee: OWENS CORNING INTELLECTUAL CAPITAL, LLC, Toledo, OH (US)

(*) Notice: Subject to any disclaimer, the term of this patent is extended or adjusted under 35 U.S.C. 154(b) by 0 days.

(21) Appl. No.: 15/962,175

(22) Filed: Apr. 25, 2018

(65) Prior Publication Data

US 2018/0313089 A1    Nov. 1, 2018

Related U.S. Application Data

(60) Provisional application No. 62/490,081, filed on Apr. 26, 2017.

(51) Int. Cl.
  *E04D 5/12*    (2006.01)
  *E04D 1/00*    (2006.01)

(52) U.S. Cl.
  CPC .......... *E04D 5/12* (2013.01); *E04D 2001/005* (2013.01)

(58) Field of Classification Search
  CPC ....... E04D 5/12; E04D 2001/005; E04D 1/26; B32B 5/22; B32B 5/30; B32B 5/16
  See application file for complete search history.

(56) References Cited

U.S. PATENT DOCUMENTS

| | | |
|---|---|---|
| 4,040,867 A | 8/1977 | Forestieri et al. |
| 4,830,038 A | 5/1989 | Anderson et al. |
| 4,936,938 A | 6/1990 | Simpson et al. |
| 5,096,759 A | 3/1992 | Simpson et al. |
| 5,437,735 A | 8/1995 | Younan et al. |
| 5,571,596 A | 11/1996 | Johnson |
| 5,743,970 A | 4/1998 | Czubatjy et al. |
| 5,811,180 A | 9/1998 | Berdahl |
| 6,014,847 A * | 1/2000 | Phillips ............. E04D 1/26 52/311.1 |
| 6,454,848 B2 | 9/2002 | Sliwinski et al. |
| 6,790,307 B2 * | 9/2004 | Elliott ............. B05D 1/30 118/314 |
| 6,797,396 B1 | 9/2004 | Liu et al. |
| 6,823,637 B2 * | 11/2004 | Elliott ............. E04D 1/26 52/314 |

(Continued)

*Primary Examiner* — Adriana Figueroa
(74) *Attorney, Agent, or Firm* — Calfee, Halter & Griswold LLP

(57) ABSTRACT

A laminated roofing shingle has an overlay sheet having top surface and bottom surface opposite the top surface. The overlay sheet includes a headlap portion and a butt portion. The butt portion defines a series of tabs and cutouts. An underlay substrate has a top surface attached to the bottom surface of the butt portion of the overlay sheet. The underlay sheet includes a covered portion positioned beneath the tabs of the overlay sheet and a prime portion positioned beneath the cutouts. A layer of reflectivity-increasing granules and/or a layer reflectivity-increasing asphalt, is positioned on only one or both of the tabs of the overlay sheet and the prime portion of the underlay sheet.

20 Claims, 15 Drawing Sheets

(56) References Cited

U.S. PATENT DOCUMENTS

| | | |
|---|---|---|
| 6,872,440 B1 | 3/2005 | Kiik et al. |
| 6,933,007 B2 * | 8/2005 | Fensel ................ B32B 5/16 427/186 |
| 7,033,655 B2 | 4/2006 | Beteille et al. |
| 7,049,803 B2 | 5/2006 | Dorner et al. |
| 7,238,408 B2 * | 7/2007 | Aschenbeck ........... D06N 5/00 428/150 |
| 7,241,500 B2 * | 7/2007 | Shiao ................ E04D 5/12 428/402 |
| 7,452,598 B2 | 11/2008 | Shiao et al. |
| 7,592,066 B2 | 9/2009 | Shiao et al. |
| 7,641,959 B2 | 1/2010 | Joedicke |
| 7,648,755 B2 | 1/2010 | Gross et al. |
| 7,665,261 B2 * | 2/2010 | Elliott ............... E04D 1/26 52/314 |
| 7,685,784 B2 | 3/2010 | Wang et al. |
| 7,877,949 B1 * | 2/2011 | Elliott ............... E04D 1/26 52/314 |
| 8,007,898 B2 * | 8/2011 | Bailey ............... E04D 1/12 428/143 |
| 8,034,432 B2 | 10/2011 | Joedicke |
| 8,114,516 B2 | 2/2012 | Shiao et al. |
| 8,277,943 B2 | 10/2012 | Viasnoff et al. |
| 8,349,435 B2 | 1/2013 | Shiao et al. |
| 8,535,803 B2 | 9/2013 | Shiao et al. |
| 8,551,619 B2 | 10/2013 | Viasnoff et al. |
| 8,628,850 B2 | 1/2014 | Shiao et al. |
| 8,673,427 B2 | 3/2014 | Kalkanoglu et al. |
| 8,722,140 B2 * | 5/2014 | Shiao ................ C03C 10/00 427/186 |
| 8,763,339 B2 | 7/2014 | Bryson et al. |
| 8,828,519 B2 | 9/2014 | Wen et al. |
| 8,852,680 B2 | 10/2014 | Shiao et al. |
| 8,865,303 B2 | 10/2014 | Sexauer et al. |
| 8,966,850 B2 * | 3/2015 | Jenkins ............... E04D 1/26 52/518 |
| 8,997,427 B2 | 4/2015 | Kalkanoglu et al. |
| 9,034,445 B2 | 5/2015 | Edwards et al. |
| 9,200,451 B2 | 12/2015 | Hong et al. |
| 9,248,472 B2 | 2/2016 | Viasnoff |
| 9,303,407 B2 | 4/2016 | Sexauer et al. |
| 9,404,259 B2 | 8/2016 | Heulings et al. |
| 9,404,263 B2 * | 8/2016 | Kiik .................. E04D 3/35 |
| 9,499,712 B2 * | 11/2016 | Rokowski ............ C09D 133/00 |
| 9,511,566 B2 | 12/2016 | Grube et al. |
| 9,739,062 B2 * | 8/2017 | Leitch .................. E04D 1/26 |
| 2005/0007480 A1 | 1/2005 | Hamano et al. |
| 2005/0072114 A1 | 4/2005 | Shiao et al. |
| 2005/0142329 A1 | 6/2005 | Anderson et al. |
| 2005/0145139 A1 | 7/2005 | Khan et al. |
| 2005/0257875 A1 | 11/2005 | Khan et al. |
| 2005/0261407 A1 | 11/2005 | Khan et al. |
| 2006/0172643 A1 | 8/2006 | Greaves et al. |
| 2006/0207646 A1 | 9/2006 | Terreau et al. |
| 2006/0225776 A1 | 10/2006 | Nemazi et al. |
| 2006/0266406 A1 | 11/2006 | Faust et al. |
| 2007/0065640 A1 | 3/2007 | Joedicke |
| 2007/0218251 A1 | 9/2007 | Jacobs et al. |
| 2007/0295387 A1 | 12/2007 | Adriani et al. |
| 2007/0295388 A1 | 12/2007 | Adriani et al. |
| 2008/0008832 A1 | 1/2008 | Shiao et al. |
| 2008/0095984 A1 | 4/2008 | Desouto |
| 2008/0160321 A1 | 7/2008 | Padiyath et al. |
| 2009/0068384 A1 | 3/2009 | Seth et al. |
| 2009/0241450 A1 | 10/2009 | Italiane et al. |
| 2011/0027533 A1 | 2/2011 | Kennedy et al. |
| 2011/0146531 A1 | 6/2011 | Mitra |
| 2011/0223385 A1 | 9/2011 | Shiao et al. |
| 2011/0311774 A1 | 12/2011 | Gin et al. |
| 2012/0088071 A1 * | 4/2012 | Bailey ............... E04D 1/26 428/143 |
| 2012/0180948 A1 | 7/2012 | Aschenbeck |
| 2013/0034697 A1 | 2/2013 | Shiao et al. |
| 2013/0202852 A1 | 8/2013 | Shiao et al. |
| 2013/0330481 A1 | 12/2013 | Viasnoff et al. |
| 2014/0121297 A1 * | 5/2014 | Desphy ............... C09D 5/028 523/135 |
| 2014/0248467 A1 | 9/2014 | Shiao et al. |
| 2014/0366775 A1 | 12/2014 | Wen et al. |
| 2015/0192698 A1 | 7/2015 | Joedicke et al. |
| 2015/0225957 A1 | 8/2015 | Tangeman et al. |
| 2015/0252566 A1 | 9/2015 | Tangeman et al. |
| 2015/0266774 A1 | 9/2015 | Budd et al. |
| 2016/0002474 A1 | 1/2016 | Wen et al. |
| 2016/0083962 A1 | 3/2016 | Hong et al. |
| 2016/0273223 A1 | 9/2016 | Sexauer et al. |
| 2016/0289971 A1 | 10/2016 | Becker, IV |
| 2017/0051508 A1 | 2/2017 | Shiao et al. |

* cited by examiner

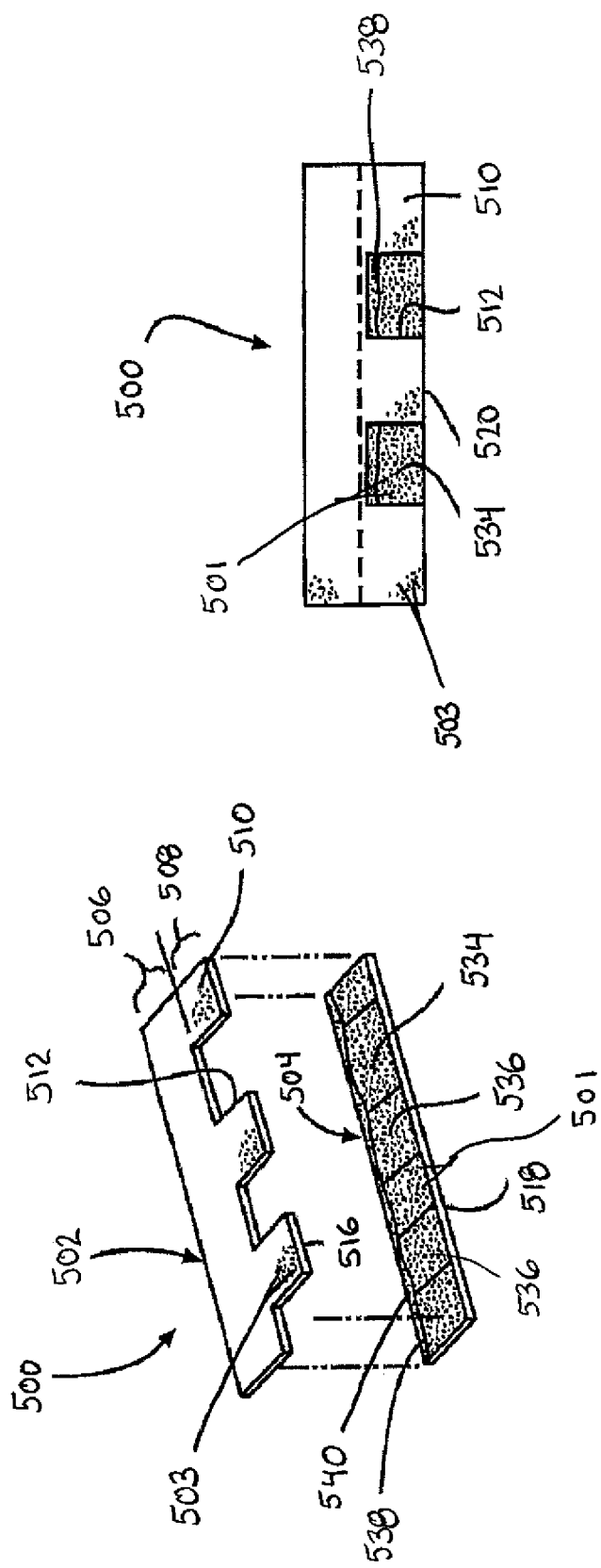

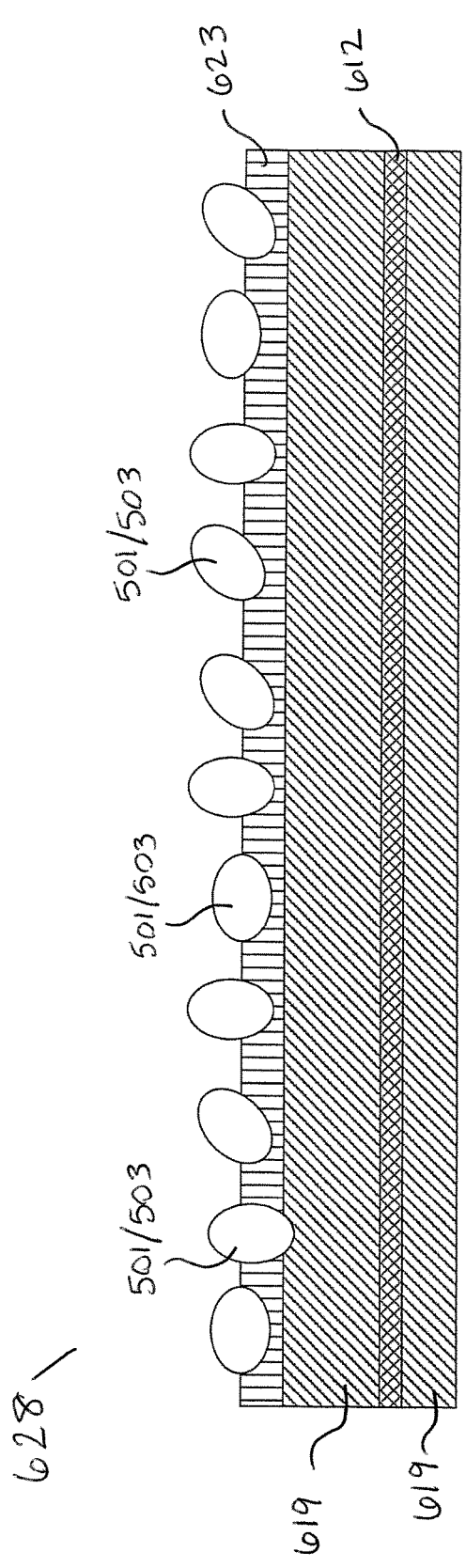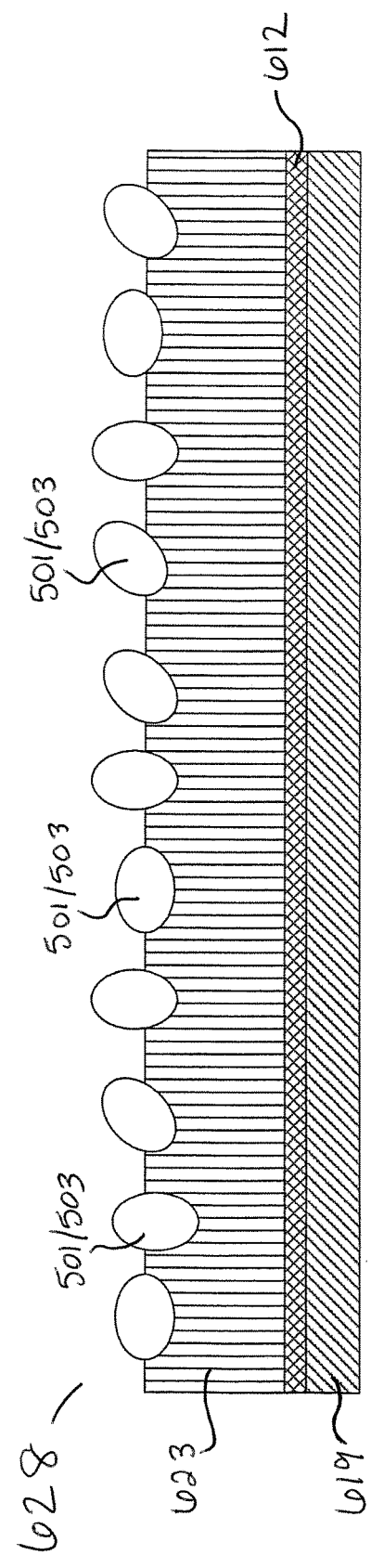
Fig. 6C
Fig. 6D

ASPHALT BASED ROOFING MATERIAL WITH INCREASED INFRARED REFLECTIVITY

RELATED APPLICATION

This application claims priority to Provisional Application No. 62/490,081, titled Asphalt Based Roofing Material with Infrared-Reflective Granules, and filed Apr. 26, 2017.

FIELD

This disclosure relates to asphalt-based roofing materials. More particularly, this disclosure relates to asphalt-based roofing materials having increased infrared reflectivity and to methods of producing thereof.

BACKGROUND

Asphalt-based roofing materials, such as roofing shingles, roll roofing and commercial roofing, are installed on the roofs of buildings to provide protection from the elements, and to give the roof an aesthetically pleasing look. Typically, the roofing material is constructed of a substrate such as a glass fiber mat or an organic felt, an asphalt coating on the substrate, and a surface layer of granules embedded in the asphalt coating.

A common method for the manufacture of asphalt shingles is the production of a continuous sheet of asphalt material followed by a shingle cutting operation which cuts the material into individual shingles. In the production of asphalt sheet material, either a glass fiber mat or an organic felt mat is passed through a coater containing hot liquid asphalt to form a tacky, asphalt-coated sheet. Subsequently, the hot asphalt-coated sheet is passed beneath one or more granule applicators which discharge protective and decorative surface granules onto portions of the asphalt sheet material.

In the manufacture of colored shingles, two types of granules are typically employed. Headlap granules are granules of relatively low cost used for the portion of the shingle which will be covered up on the roof. Colored granules, prime granules, or other reflectivity-increasing granules are of relatively higher cost and are applied to the portion of the shingle that will be exposed on the roof. In some applications, specialized granules that provide increased solar heat reflectance to reduce the solar absorption of the shingle may be used. For example, U.S. Published Patent Application No. 2005/0072114, entitled "Colored Roofing Granules with Increased Solar Heat Reflectance, Solar Heat-Reflective Shingles, and Process for Producing Same," the entire disclosure of which is incorporated herein by reference, discloses colored infrared-reflective roofing granules that provide increased solar heat reflectance.

One of the problems with conventional granule application methods for manufacturing laminated shingles is that the underlay will be covered by the relatively more expensive prime granules. In such conventional methods for manufacturing laminated shingles, even the portions of the underlay that will be covered by the tabs of the overlay are covered with prime granules.

Further, asphalt shingles are commonly produced from a continuous sheet of traditional, black asphalt material followed by a shingle cutting operation which cuts the material into individual shingles. When granules are discharged onto the black asphalt sheet, the granules do not cover the entirety of the shingle and the asphalt will be exposed on the roof. As a result, the exposed traditional, black asphalt will absorb solar heat.

SUMMARY

A laminated roofing shingle has an overlay sheet having a top surface and a bottom surface opposite the top surface. The overlay sheet includes a headlap portion and a butt portion. The butt portion defines a series of tabs and cutouts. An underlay substrate has a top surface attached to the bottom surface of the butt portion of the overlay sheet. The underlay sheet includes a covered portion positioned beneath the tabs of the overlay sheet and a prime portion positioned beneath the cutouts. A layer of colored granules, including reflectivity-increasing granules, positioned only on the tabs of the overlay sheet, or only on the exposed prime portion of the underlay sheet. In another embodiment, reflectivity-increasing granules are positioned only on the tabs of the overlay sheet and only on the exposed prime portion of the underlay sheet.

A laminated roofing shingle has an overlay sheet having a top surface and a bottom surface opposite the top surface. The overlay sheet includes a headlap portion and a butt portion. The butt portion defines a series of tabs and cutouts. An underlay substrate has a top surface attached to the bottom surface of the butt portion of the overlay sheet. The underlay sheet includes a covered portion positioned beneath the tabs of the overlay sheet and a prime portion positioned beneath the cutouts. A layer of reflectivity-increasing asphalt, positioned only on the tabs of the overlay sheet, or only on the exposed prime portion of the underlay sheet. In another embodiment, the reflectivity-increasing asphalt is positioned only on the tabs of the overlay sheet and only on the exposed prime portion of the underlay sheet.

A method for manufacturing a laminated roofing shingle includes forming an asphalt coated sheet having a top side, an overlay sheet portion, and an underlay sheet portion. The overlay sheet portion has a tab sheet portion and a headlap portion. The underlay sheet has a prime sheet portion and a covered sheet portion. Colored granules, including reflectivity-increasing granules, are applied to the top side of only the tab sheet portion of the overlay sheet portion or only the exposed prime portion of the underlay sheet portion. In another embodiment, reflectivity-increasing granules are applied only on the tab sheet portion and only on the exposed prime portion of the underlay sheet.

BRIEF DESCRIPTION OF THE DRAWINGS

FIG. 5A is an exploded schematic perspective view of an exemplary embodiment of a laminated shingle having reflectivity-increasing granules;

FIG. 5B is a schematic plan view of the laminated shingle illustrated in FIG. 5A;

FIG. 6C is a cross-sectional side view of a first exemplary granule-coated sheet having a reflectivity-increasing asphalt layer;

FIG. 6D is a cross sectional side view of a second exemplary granule-coated sheet having a reflectivity-increasing asphalt layer;

DETAILED DESCRIPTION

Figure 1:
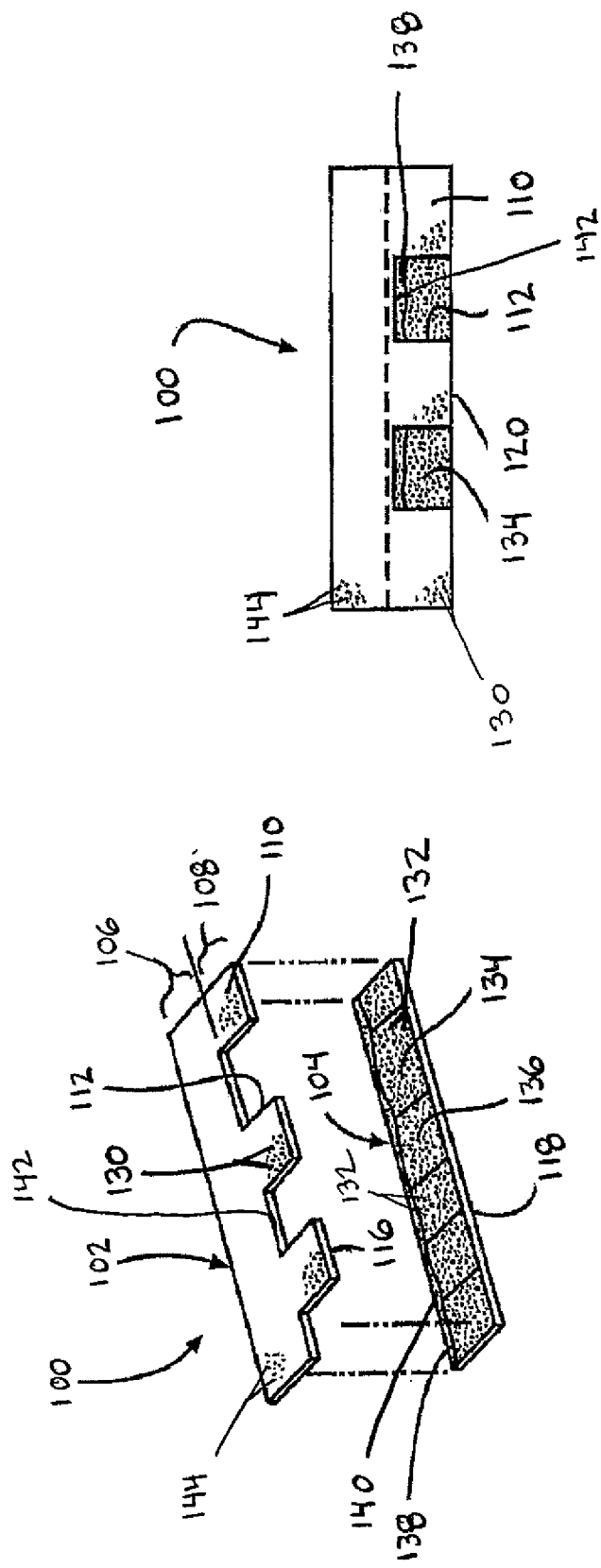
FIG. 1A is an exploded schematic perspective view of an exemplary embodiment of a laminated shingle having reflectivity-increasing granules.
FIG. 1B is a schematic plan view of the laminated shingle illustrated in FIG. 1A.

The present application describes asphalt-based roofing material with occasional reference to the illustrated exemplary embodiments. This roofing material may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities, values, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description and the appended claims, the phrase "asphalt coating" is defined as any type of bituminous material suitable for use on a roofing material, such as asphalts, tars, pitches, or mixtures thereof. The asphalt may be manufactured asphalt produced by refining petroleum or made from nonpetroleum-based renewable resources, such as sugar, molasses and rice, corn and potato starches, or may be naturally occurring asphalt. The asphalt coating may include various additives and/or modifiers, such as inorganic fillers or mineral stabilizers, organic materials such as polymers, recycled streams, or ground tire rubber. Preferably, the asphalt coating contains asphalt and an inorganic filler or mineral stabilizer.

Laminated composite shingles, such as asphalt shingles, are a commonly used roofing product. Asphalt shingle production generally includes feeding a base material from an upstream roll and coating it first with a roofing asphalt material, then a layer of granules. The base material is typically made from a fiberglass mat provided in a continuous shingle membrane or sheet. It should be understood that the base material can be any suitable support material.

The present application discloses various exemplary embodiments of asphalt-based roofing materials having increased infrared-reflecting properties. In one exemplary embodiment, the asphalt-based roofing material has infrared-reflective granules selectively applied to specific portions of the materials. In another exemplary embodiment, the asphalt-based roofing material has infrared-reflective asphalt selectively applied to specific portions of the material. In an even further exemplary embodiment, the asphalt-based roofing material has infrared-reflective granules and infrared-reflective asphalt each applied to specific portions of the material. The asphalt-based roofing materials may be configured in a variety of ways.

FIGS. 1A and 1B illustrate an exemplary embodiment of an asphalt-based roofing material in the form of a laminated shingle 100. Although FIGS. 1A and 1B and FIGS. 8A through 8F illustrate exemplary embodiments of a laminated shingle, it will be understood that the method and apparatus disclosed herein may be used with other asphalt-based roofing materials, such as for example, single layer shingles (e.g., three-tab shingles).

In the illustrated embodiment of FIGS. 1A and 1B, the laminated shingle 100 may include an overlay sheet 102 and an underlay sheet 104. The overlay sheet 102 includes an upper or headlap portion 106, and a lower prime or butt portion 108. The butt portion 106 includes a repeated pattern of the tabs 110 and cutouts 112. A rear surface of the overlay sheet 102 and a front surface of the underlay sheet 104 are fixedly attached to each other to form the laminated shingle 100. Such attachment can be accomplished by using adhesive materials applied to the rear surface of the overlay sheet 102 and the front surface of the underlay sheet 104. In the illustrated embodiment, a butt edge 116 of the butt portion 108 of the overlay sheet 102 and a lower edge 118 of the underlay sheet 104 are vertically aligned to define a lower edge 120 of the shingle 100. If desired, a bead of adhesive (not shown) may be applied to a bottom surface of the underlay sheet 104.

In the illustrated embodiment of FIGS. 1A and 1B, the laminated shingle 100 includes reflectivity-increasing granules 130 selectively applied to only a portion of the laminated shingle 100. The reflectivity-increasing granules 130 may take a wide variety of forms. The reflectivity-increasing granules 130 may be any shape, size, coating, color, density, or material of a granule that can reflect heat away from the shingle and/or reduce the amount of heat absorbed by the shingle. For example, the reflectivity-increasing granules 130 may be specially sized, specially coated, specially color (e.g., white), or modified in any other way known in the art, and any combination of these properties, to increase the infrared-reflective properties of the granules. The reflectivity-increasing granules 130 may be applied to any desired portion of the shingle 100. As used in the description and the appended claims, the phrases "infrared-reflective" granules or "reflectivity-increasing" granules are defined as granules with a solar heat reflectance of at least about 21 percent and the phrase "colored conventional granules" is defined as colored granules with a solar heat reflectance of less than about 20 percent.

In a first preferred embodiment, the reflectivity-increasing granules 130 are colored, infrared-reflective granules, such as the granules disclosed in U.S. Published Patent Application No. 2005/0072114, selectively applied to only a portion of the laminated shingle 100. Colored infrared-reflective roofing granules have a higher solar heat reflectance than colored roofing granules prepared using conventional metal oxide colorants, which typically have a solar heat reflectance of from about 12 percent to about 20 percent.

In a second preferred embodiment, the reflectivity-increasing granules 130 are finer of a smaller size or coarse which increases the infrared-reflective properties of the granules. Finer or smaller granules have a higher solar heat reflectance (i.e., absorb less heat) than larger or more coarse granules. In such an embodiment, the reflectivity-increasing granules 130 may be any granules finer than grade 11, preferably finer than grade 15, such as grade 18. The finer granules may be selectively applied to only a portion of the laminated shingle.

In a third preferred embodiment, the colored, infrared-reflective granules, the reflectivity-increasing granules 130 are colored, infrared-reflective granules that are finer than grade 11, preferably finer than grade 15, such as grade 18. The colored, infrared-reflective granules that are finer than grade 11 may be selectively applied to only a portion of the laminated shingle.

In the illustrated embodiment, the reflectivity-increasing granules 130 are applied only to the tab portion 110 of an overlay sheet 102, while colored conventional granules 132 are selectively applied to a prime portion 134 of the underlay sheet 104 or to both the prime portion 134 and a covered portion 136 of the underlay sheet 104. The conventional granules 132 may be any type, size, shape, or color granule that is generally or conventionally used in laminated shingles. In a preferred embodiment, the conventional granules 132 are colored and of the size generally used for portions of the shingle which are exposed when the shingles are secured on a roof in a fixed array (e.g., the conventional granules are Grade 11).

The prime portion 134 of the underlay sheet 104 refers to the visible portion of the underlay sheet 104 that is positioned between the tabs 110 of the overlay sheet 102 when overlay sheet 102 and underlay sheet 104 are assembled. The covered portion 136 of the underlay sheet 104 refers to the portion of the underlay sheet 104 that will be underneath the tab portions 110 of the overlay sheet 102, and will not be visible in the finished laminated shingle 100. The remaining portions of the shingle 100, such as the headlap portion 106 of the overlay sheet 102 are covered with relatively less expensive granules, such as headlap granules. An optional shadow strip 138 is formed along an edge 140 (the upper edge when viewing FIG. 1A) of the underlay sheet 104, and will be described in detail below.

Figure 2:
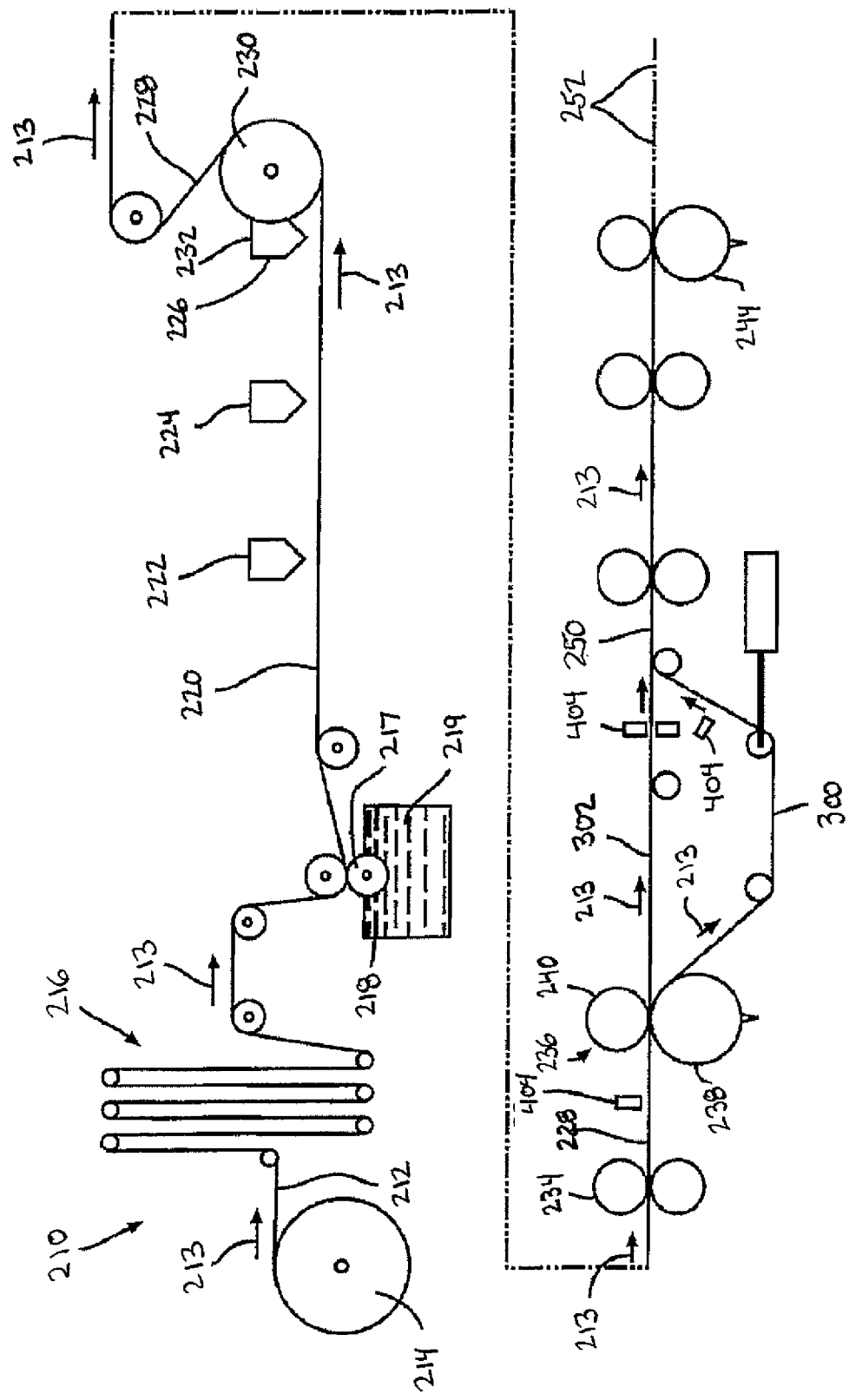
FIG. 2 is a schematic view in elevation of an exemplary embodiment of an apparatus for manufacturing an asphalt-based roofing material.

Referring now to FIG. 2, an exemplary embodiment of an apparatus 210 for manufacturing asphalt-based roofing material having infrared-reflective granules selectively applied to the roofing material. The apparatus and manufacturing process may be configured in a variety of ways. Any apparatus and process that can manufacture an asphalt-based roofing material with infrared-reflective granules selectively applied to the roofing material, such as for example, only to a portion of the roofing material, may be used. For example, some exemplary embodiments of the asphalt-based roofing material disclosed in the present application may be manufactured by the method disclosed in U.S. Patent Application Publication U.S. 2012/0180948, entitled "Method for Controlling the Deposition of Granules on an Asphalt-Coated Sheet," the entire disclosure of which is incorporated herein by reference.

The illustrated manufacturing process involves passing a continuous sheet of substrate or shingle mat 212 in a machine direction 213 through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute). Other speeds, however, may be used.

In a first step of the manufacturing process, the continuous sheet of shingle mat 212 is payed out from a roll 214. The shingle mat 212 may be any type known for use in reinforcing asphalt-based roofing materials, such as a nonwoven web of glass fibers. Alternatively, the substrate may be a scrim or felt of fibrous materials such as mineral fibers, cellulose fibers, rag fibers, mixtures of mineral and synthetic fibers, or the like.

The sheet of shingle mat 212 is passed from the roll 214 through an accumulator 216. The accumulator 216 allows time for splicing one roll 214 of substrate to another, during which time the shingle mat 212 within the accumulator 216 is fed to the manufacturing process so that the splicing does not interrupt manufacturing.

Next, the shingle mat 212 is passed through a coater 218 where a coating of hot, melted asphalt 219 is applied to the shingle mat 212 to form an asphalt-coated sheet 220. The asphalt coating 219 may be applied in any suitable manner. In the illustrated embodiment, the shingle mat 212 contacts a roller 217, which is in contact with the supply of hot, melted asphalt 219. The roller 217 completely covers the shingle mat 212 with a tacky coating of asphalt 219. However, in other embodiments, the asphalt coating 219 could be sprayed on, rolled on, or applied to the shingle mat 212 by other means. Typically, the asphalt coating is highly filled with a ground mineral filler material, amounting to at least about 42 percent by weight of the asphalt/filler combination. In one embodiment, the asphalt coating 219 is in a range from about 350 degrees Fahrenheit to about 400 degrees Fahrenheit. In another embodiment, the asphalt coating 219 may be more than 400 degrees Fahrenheit or less than 350 degrees Fahrenheit. The shingle mat 212 exits the coater 218 as the asphalt-coated sheet 220. The asphalt coating 219 on the asphalt-coated sheet 220 remains hot.

Figure 3:
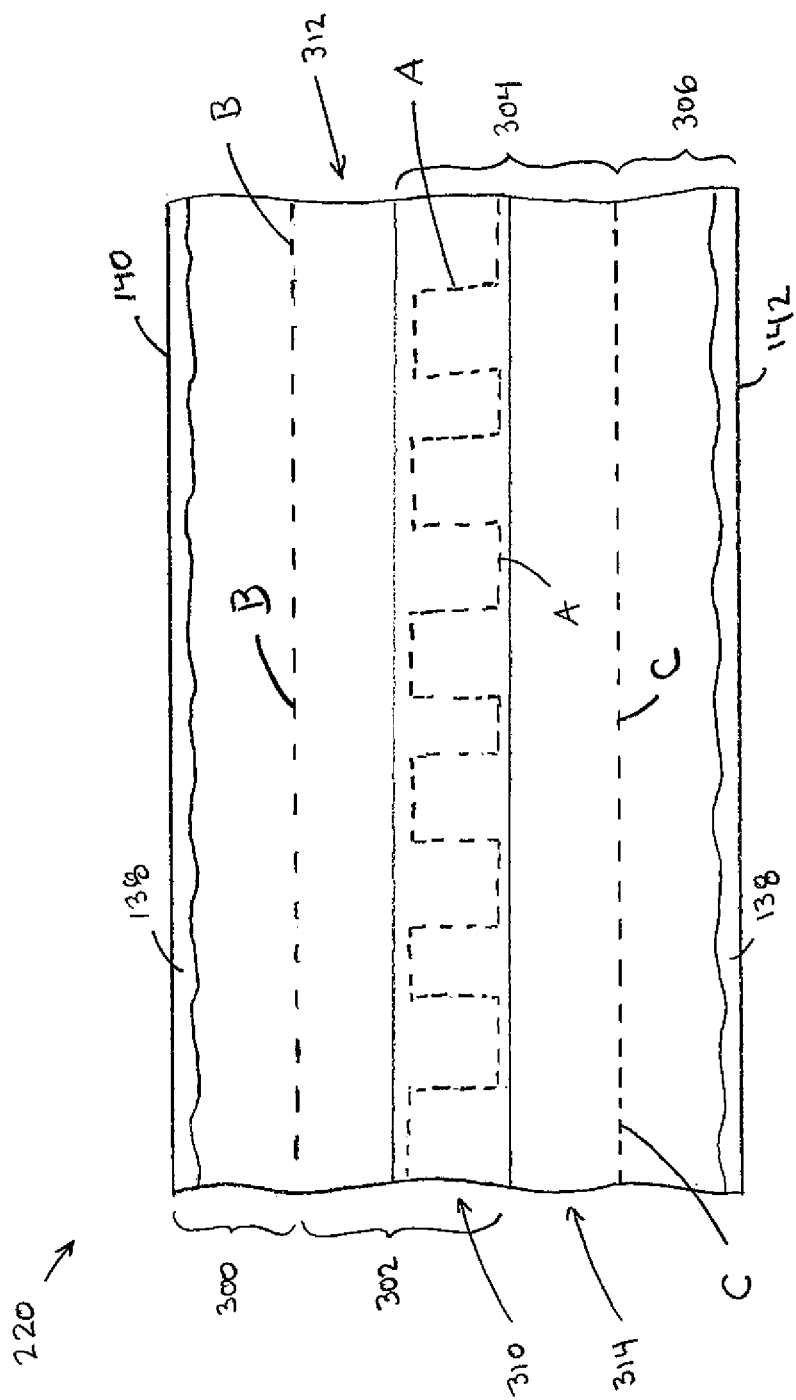
FIG. 3 is a plan view of a portion of an asphalt coated sheet produced by the apparatus of FIG. 2.

Referring to FIG. 3, the asphalt-coated sheet 220 includes a first continuous underlay sheet portion 300, a first continuous overlay sheet portion 302, a second continuous overlay sheet portion 304, and a second continuous underlay sheet portion 306. The first continuous overlay sheet portion 302 includes a continuous tab sheet portion 310 and a first continuous headlap sheet portion 312. The second continuous overlay sheet portion 304 includes a second continuous headlap portion 312 and shares the first continuous headlap sheet portion 312 with the first continuous overlay sheet portion 302.

Referring to FIGS. 2 and 3, the asphalt-coated sheet 220 is passed beneath a first granule applicator, shown schematically at 222, where first or colored conventional granules are applied to the first and second continuous underlay sheet portions 300, 306. In the illustrated embodiment, the conventional colored granules are applied to the continuous underlay sheet portion 300, 306 such that both the prime portion 134 and the covered region 136 (FIG. 1A) will be covered with a single blended color utilizing the conventional colored granules. In other embodiments, however, the conventional colored granules may be applied only to the prime portion 134 or may be applied as blend drops to the prime portion 134, the covered portion 136, or both.

Figure 4:
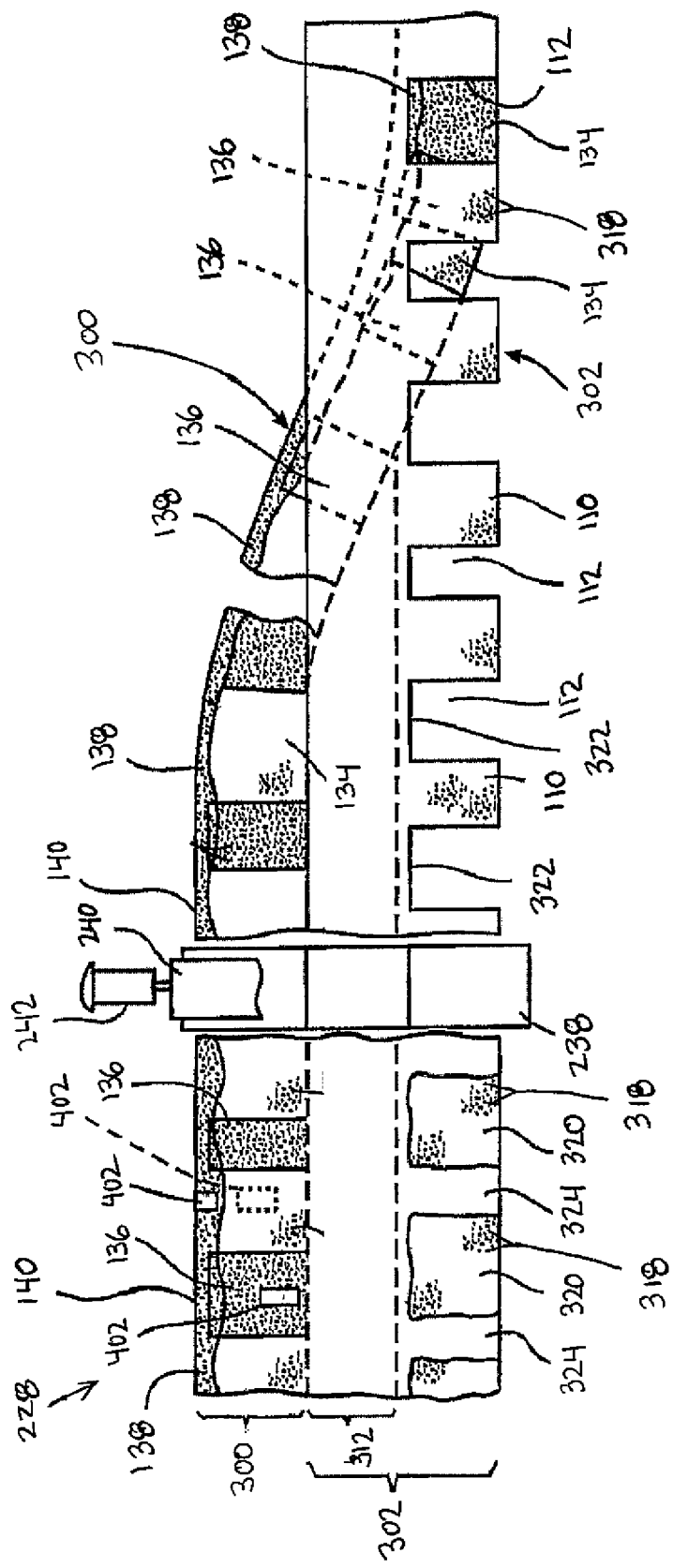
FIG. 4 is a plan view of a portion of the apparatus illustrated in FIG. 2, showing the laminating of the continuous underlay sheet beneath the continuous overlay sheet to form a continuous laminated sheet.

The asphalt-coated sheet 220 is then passed beneath a second granule applicator 224. In the illustrated embodiment, the second granule applicator 224 is a blend drop applicator. The blend drop applicator 224 applies second or blend drop granules 318 containing reflectivity-increasing granules to the continuous tab sheet portion 310 of the asphalt-coated sheet 220 to define blend drops 320 (FIG. 4). The second or blend drop granules 318 may be a mixture of reflectivity-increasing granules and other granules, such as for example, first or conventional colored granules. Alternatively, second or blend drop granules 318 may be entirely reflectivity-increasing granules. Further, the second or blend drop granules 318 may be a mixture of types of reflectivity-increasing granules. For example, the second or blend drop granules 318 may be a mixture of colored, infrared-reflective granules (cool granules) and finer granules, or the blend drop granules 318 may be one type of granules which is both colored, infrared-reflective and fine enough to reduce heat absorption.

Although only one blend drop applicator 224 is illustrated in FIG. 2, it will be understood that several blend drop applicators 224 may be used. Alternatively, the blend drop applicator 224 may be adapted to supply several streams of blend drops, or blend drops of different colors, shading, or size to the continuous tab sheet portion 310 (FIG. 3) of the asphalt-coated sheet 220.

The asphalt-coated sheet 220 is then passed beneath a third granule applicator. In the illustrated embodiment, the third granule applicator is a backfall granule applicator 226, for applying additional granules, such as shadow granules to the shadow strip 138, background granules, and headlap granules onto the asphalt-coated sheet 220.

The shadow granules are deposited along the upper edge 140 and a lower edge 142 (the upper edge and lower edge when viewing FIG. 3) of the first and second continuous underlay sheet portions 300, 306 to define the shadow strips 138. A portion of the shadow strips 138 will be visible adjacent an upper edge 142 of the cutout 112 of the laminated shingle 100. The background granules are applied to the tab sheet portion 310 of the asphalt-coated sheet 220 and adhere to a remainder portion 324; i.e., the portion of the tab sheet portion 310 that is not already covered by the blend drops 320. Similarly, the headlap granules are applied to a headlap region 312, 314 of the first and second continuous overlay sheet portions 302, 304, respectively.

The background granules are applied to the extent that the asphalt-coated sheet 220 becomes completely covered with granules, thereby defining a continuous granule-coated sheet 228. The granule-coated sheet 228 is then turned around a slate drum 230 to press the granules into the asphalt coating and to temporarily invert the sheet 228. Such inverting of the granule-coated sheet 228 causes any excess granules to drop off the granule-coated sheet 228 on the backside of the slate drum 230. The excess granules are collected by a hopper 232 of the backfall granule applicator 226 and may be reused. As described below, the hopper 232 is positioned on the backside of the slate drum 230.

The continuous granule-coated sheet 228 is fed through pull rolls 234 that regulate the speed of the granule-coated sheet 228 as it moves downstream. In one embodiment, at least one of the pull rolls 234 is driven by a motor (not shown).

The granule-coated sheet 228 is subsequently fed through a rotary pattern cutter 236 which includes a bladed cutting cylinder 238, a backup roll 240, and a motor 242, as shown in FIG. 4. The pattern cutter 236 cuts a repeated pattern of tabs 286 and cutouts 288 through the tab sheet portion 310, as shown by dashed line A in FIG. 3. Cutting the repeated pattern of tabs 286 and cutouts 288 separates the first overlay sheet portion 302 from the second overlay sheet portion 304.

The pattern cutter 236 also cuts the granule-coated sheet 228 to separate the first continuous underlay sheet 300 from the first overlay sheet portion 302 and to separate the second continuous underlay sheet 306 from the second overlay sheet portion 304, as shown by the dashed line B and C in FIG. 3, respectively.

FIG. 4, for simplicity, illustrates the first continuous underlay sheet 300 and the first continuous overlay sheet portion 302 while omitting the second continuous underlay sheet 306 and the second overlay sheet portion 304. It will be understood that the description of the FIG. 4 applies equally to forming a continuous laminated sheet and laminated shingles from the second continuous underlay sheet 306 and the second overlay sheet portion 304. Referring to FIG. 4, the first continuous underlay sheet 300 is directed to be aligned beneath the first continuous overlay sheet 302, and the two sheets 300, 302 are laminated together to form a continuous laminated sheet 250. As shown in FIG. 2, the first continuous underlay sheet 300 is routed on a longer path than the path of the first continuous overlay sheet 302. Further downstream, the continuous laminated sheet 250 is passed into contact with a rotary length cutter 244 that cuts the laminated sheet 250 into individual laminated shingles 252.

To facilitate synchronization of the cutting and laminating steps, various sensors and controls can be employed, as disclosed in U.S. Pat. No. 6,635,140 to Phillips et al., the disclosure of which is incorporated herein by reference. For example, one or more timing marks 402 (FIG. 4), as known in the art, may be applied to an appropriate part of the granule-coated sheet 228 to identify specific portions of the sheet. The timing may be sensed by one or more sensors 404 (FIG. 2), such as a photoeyes, for synchronization with the rotating rotary patter cutter 236.

FIGS. 5A and 5B illustrated another exemplary embodiment of an asphalt-based roofing material in the form of a laminated shingle 500. The laminated shingle 500 is similar to the laminated shingle 100 of FIGS. 1A and 1B in that the laminated shingle 500 may include an overlay sheet 502 and an underlay sheet 504. The overlay sheet 502 includes an upper or headlap portion 506, and a lower prime or butt portion 508. The butt portion 508 includes a repeated pattern of the tabs 510 and cutouts 512. A rear surface of the overlay sheet 502 and a front surface of the underlay sheet 504 are fixedly attached to each other to form the laminated shingle 500. Such attachment can be accomplished by using adhesive materials applied to the rear surface of the overlay sheet 502 and the front surface of the underlay sheet 504. In the illustrated embodiment, a butt edge 516 of the butt portion 508 of the overlay sheet 502 and a lower edge 518 of the underlay sheet 504 are vertically aligned to define a lower edge 520 of the shingle 500. If desired, a bead of adhesive (not shown) may be applied to a bottom surface of the underlay sheet 504.

In the illustrated embodiment of FIGS. 5A and 5B, the laminated shingle 500 includes reflectivity-increasing granules 501. As discussed above, the reflectivity-increasing granules 501 may take a wide variety of forms. The reflectivity-increasing granules 501 may be any shape, size, coating, color, density, or material that can reflect heat away from the shingle and/or reduce the amount of heat absorbed by the shingle. For example, the reflectivity-increasing granules 501 may be specially sized, specially coated, specially color (e.g., white), or modified in any other way known in the art, and any combination of these properties, to increase the infrared-reflective properties of the granules. The reflectivity-increasing granules 501 may be applied to any desired portion of the shingle 500. The reflectivity-increasing granules 501 can be blended with conventional granules in any proportion or may be used without conventional granules. As used in the description and the appended claims, the phrases "infrared-reflective" granules or "reflectivity-increasing" granules are defined as granules with a solar heat reflectance of at least about 21 percent and the phrase "colored conventional granules" is defined as colored granules with a solar heat reflectance of less than about 20 percent.

In a first preferred embodiment, the reflectivity-increasing granules 501 are colored, infrared-reflective granules, such as the granules disclosed in U.S. Published Patent Application No. 2005/0072114, selectively applied to only a portion of the laminated shingle 500. Colored infrared-reflective roofing granules have a higher solar heat reflectance than colored roofing granules prepared using conventional metal oxide colorants, which typically have a solar heat reflectance of from about 12 percent to about 20 percent.

In a second preferred embodiment, the reflectivity-increasing granules 501 are finer of a smaller size or coarse which increases the infrared-reflective properties of the granules. Finer or smaller granules have a higher solar heat reflectance (i.e., absorb less heat) than larger or more coarse granules. In such an embodiment, the reflectivity-increasing granules 130 may be any granules finer than grade 11, preferably finer than grade 15, such as grade 18. The finer granules may be selectively applied to only a portion of the laminated shingle 500. The reflectivity-increasing granules 501 can be blended with conventional granules in any proportion or may be used without conventional granules.

In a third preferred embodiment, the colored, the reflectivity-increasing granules 501 are colored, infrared-reflective granules that are finer than grade 11, preferably finer than grade 15, such as grade 18. The colored, infrared-reflective granules that are finer than grade 11 may be selectively applied to only a portion of the laminated shingle.

In particular, in the illustrated embodiment, the reflectivity-increasing granules 501 are applied only to a prime portion 534 of the underlay sheet 504, while colored conventional granules 503 are applied to a lower prime or butt portion 508 of the overlay sheet 502.

As discussed above, the colored conventional granules 503 may be colored conventional granules 132 may be any type, size, shape, or color of granule that is generally or conventionally used in laminated shingles. In a preferred embodiment, the colored conventional granules 132 are colored and of the size generally used for portions of the shingle which are exposed when the shingles are secured on a roof in a fixed array (e.g., the colored conventional granules are Grade 11).

The prime portion 534 of the underlay sheet 504 refers to the visible portion of the underlay sheet 504 that is positioned between the tabs 510 of the overlay sheet 502 when overlay sheet 502 and underlay sheet 504 are assembled. The portion of the underlay sheet 504 that will be underneath the tab portions 510 of the overlay sheet 502, and will not be visible in the finished laminated shingle 500, is referred to as the covered portion 536 of the underlay sheet 504. The remaining portions of the shingle 500, such as the headlap portion 506 of the overlay sheet 502 are covered with relatively less expensive granules, such as headlap granules. An optional shadow strip 538 is formed along an edge 540 (the upper edge when viewing FIG. 5A) of the underlay sheet 504, and will be described in detail below.

Figure 6A:
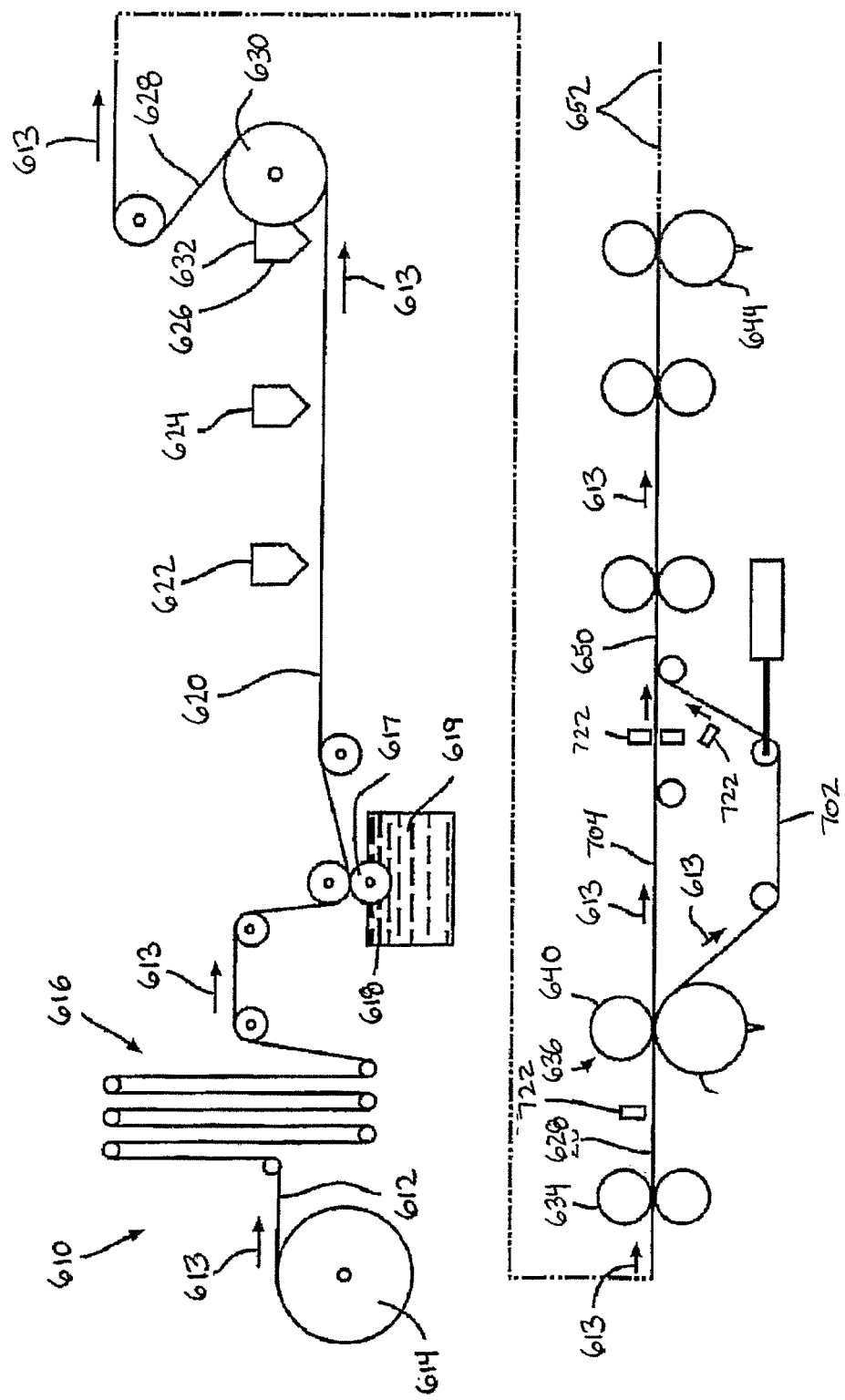
FIG. 6A is a schematic view in elevation of an exemplary embodiment of an apparatus for manufacturing an asphalt-based roofing material.

Referring to FIG. 6A, an apparatus 610 for manufacturing a first exemplary embodiment of an asphalt-based roofing material is depicted. The illustrated manufacturing process involves passing a continuous sheet of substrate or shingle mat 612 in a machine direction 613 through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute). However, other speeds may be used.

In a first step of the manufacturing process, the continuous sheet of shingle mat 612 is payed out from a roll 614. The shingle mat 612 may be any type known for use in reinforcing asphalt-based roofing materials, such as a nonwoven web of glass fibers. Alternatively, the substrate may be a scrim or felt of fibrous materials such as mineral fibers, cellulose fibers, rag fibers, mixtures of mineral and synthetic fibers, or the like.

The sheet of shingle mat 612 is passed from the roll 614 through an accumulator 616. The accumulator 616 allows time for splicing one roll 614 of substrate to another, during which time the shingle mat 612 within the accumulator 616 is fed to the manufacturing process so that the splicing does not interrupt manufacturing.

Figure 7:
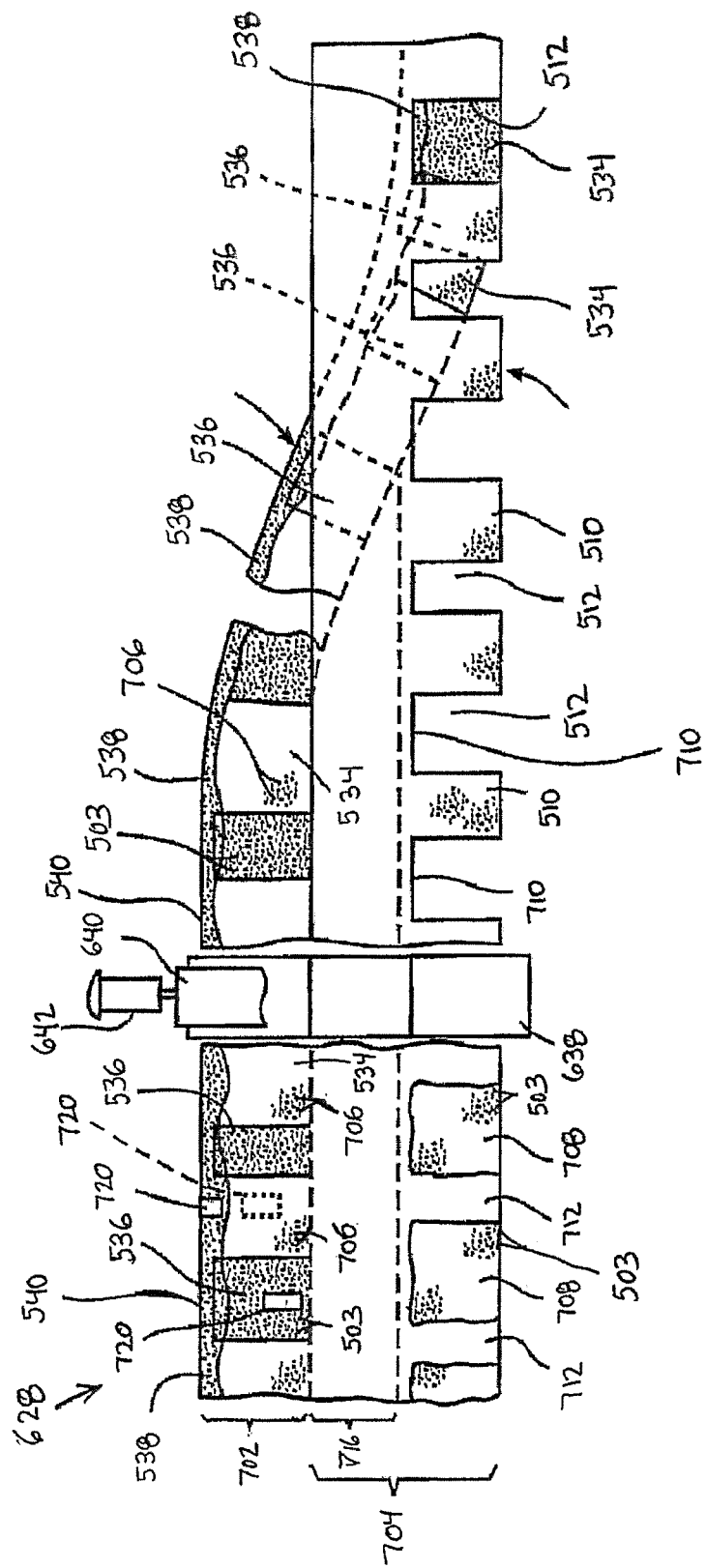
FIG. 7 is a plan view of a portion of the apparatus illustrated in FIG. 6, showing the laminating of the continuous underlay sheet beneath the continuous overlay sheet to form a continuous laminated sheet.

Next, the shingle mat 612 is passed through a first coater 618 where a coating of a first hot, melted asphalt 619 is applied to the shingle mat 612 to form an asphalt-coated sheet 620. The first hot, melted asphalt 619 may be any asphalt known in the art to apply to a shingle mat to produce an asphalt-coated sheet. In a preferred embodiment, the first hot, melted asphalt 619 is black. The first asphalt coating 619 may be applied in any suitable manner. In the illustrated embodiment, the shingle mat 612 contacts a roller 617, which is in contact with the supply of first hot, melted asphalt 619. The roller 617 completely covers the shingle mat 612 with a tacky coating of first asphalt 619. However, in other embodiments, the first asphalt coating 619 could be sprayed on, rolled on, or applied to the shingle mat 612 by other means. In a preferred embodiment, the first hot, melted asphalt 619 is applied to both the top and the bottom of the shingle mat 612. Typically, the asphalt coating is highly filled with a ground mineral filler material, amounting to at least about 42 percent by weight of the asphalt/filler combination. In one embodiment, the first asphalt coating 619 is in a range from about 350 degrees Fahrenheit to about 400 degrees Fahrenheit. In another embodiment, the first asphalt coating 619 may be more than 400 degrees Fahrenheit or less than 350 degrees Fahrenheit. The shingle mat 612 exits the coater 618 as an asphalt-coated sheet 620. The first asphalt coating 619 on the asphalt-coated sheet 620 remains hot. The asphalt-coated sheet 620 includes a continuous underlay sheet portion 702 and a continuous overlay sheet portion 704, as best shown in FIG. 7 and described in detail below.

The asphalt-coated sheet 620 is passed beneath a first granule applicator, shown schematically at 622. In the illustrated embodiment, the first granule applicator is a blend drop applicator 622 that applies first blend drop granules containing reflectivity-increasing granules 501 in a repeated pattern to the continuous underlay sheet portion 702 of the asphalt-coated sheet 520 to define blend drops 706. The first blend drop granules containing reflectivity-increasing granules 501 may be a mixture of reflectivity-increasing granules and other granules, such as for example, colored, infrared-reflective granules and colored, conventional colored granules 503 or fine granules and colored conventional granules 503. Alternatively, the first blend drop granules containing reflectivity-increasing granules 501 may be entirely reflectivity-increasing granules. For example, the first blend drop may consist entirely of colored, infrared-reflective granules, entirely of fine reflective granules, entirely of granules that are both colored, infrared-reflective and fine reflective, entirely of a mixture of colored, infrared-reflective granules and fine reflective granules, or entirely of any other type of reflectivity-increasing granule, either alone or in any combination with other reflectivity-increasing granules. In another exemplary embodiment, the reflectivity-increasing granules 501 are not applied as blend drops but rather as a single blended color covering the prime portion 534 of the continuous underlay sheet portion 702.

The location of the repeated pattern of the first blend drop granules containing reflectivity-increasing granules 501 corresponds to the repeated pattern of cutouts 512 of the finished laminated shingle 500, as shown in FIGS. 5A and 5B, such that the first blend drop granules containing reflectivity-increasing granules 501 are applied in the prime portion 534 of the underlay sheet 504.

The asphalt-coated sheet 620 is then passed beneath a second granule applicator 624. In the illustrated embodiment, the second granule applicator 624 is a second blend drop applicator, shown schematically at 624. The second blend drop applicator 624 applies colored conventional granules 503 to the continuous overlay sheet portion 704 of the asphalt-coated sheet 620 to define second blend drops 708. The colored conventional granules 503 may be any conventional granules. In a preferred embodiment, the conventional granules 503 are more cost-effective than the first blend drop granules containing reflectivity-increasing granules 501. For example, where the first blend drop granules containing reflectivity-increasing granules 501 consists entirely of colored, infrared-reflective granules, the conventional granules 503 may be colored, conventional granules, and where the first blend drop granules containing reflectivity-increasing granules 501 consists entirely of fine reflective granules, the conventional granules 503 may be conventionally sized granules. However, other variations and combinations are contemplated.

Although only one blend drop applicator 624 is shown, it will be understood that several blend drop applicators 624 may be used. Alternatively, the blend drop applicator 624 may be adapted to supply several streams of blend drops, or blend drops of different colors, shading, or size to the continuous overlay sheet portion 704. The blend drop applicator 624, in some embodiments, may also apply colored conventional colored 503 to the covered portion 536 of the continuous underlay sheet portion 702 of the asphalt-coated sheet 620.

The asphalt-coated sheet 620 is then optionally passed beneath a third granule applicator. In the illustrated embodiment, the third granule applicator is a backfall granule applicator 626, for applying additional granules, such as shadow granules to the shadow strip 538, background granules, and headlap granules onto the asphalt-coated sheet 620.

The shadow granules are deposited along the edge 540 (the upper edge when viewing FIG. 7) of the continuous underlay sheet portion 702 and define the shadow strip 538. A portion of the shadow strip 538 will be visible adjacent an upper edge 710 of the cutout 512 of the laminated shingle 500. The background granules are applied to the continuous overlay sheet portion 704 and adhere to a remainder portion 712; i.e., the portion of the continuous overlay sheet portion 704 of the asphalt-coated sheet 620 that is not already covered by the blend drops 708. Similarly, the headlap granules are applied to a headlap region 716 of the continuous overlay sheet portion 704. The background granules, in some embodiments, may also be applied to the cover portion 536 of the underlay sheet 504, if the covered portion 536 is not covered with colored, prime granules 503.

The background granules are applied to the extent that the asphalt-coated sheet 620 becomes completely covered with granules, thereby defining a continuous granule-coated sheet 628. The granule-coated sheet 628 is then turned around a slate drum 630 to press the granules into the asphalt coating and to temporarily invert the sheet 628. Such inverting of the granule-coated sheet 628 causes any excess granules to drop off the granule-coated sheet 628 on the backside of the slate drum 630. The excess granules are collected by a hopper 632 of the backfall granule applicator 626 and may be reused. As described below, the hopper 632 is positioned on the backside of the slate drum 630.

The continuous granule-coated sheet 628 is fed through pull rolls 634 that regulate the speed of the sheet 628 as it moves downstream. In one embodiment, at least one of the pull rolls 634 is driven by a motor (not shown).

The granule-coated sheet 628 is subsequently fed through a rotary pattern cutter 636 which includes a bladed cutting cylinder 638, a backup roll 640, and a motor 642, as shown in FIG. 7. The pattern cutter 636 cuts a repeated pattern of tabs 510 and cutouts 512.

The pattern cutter 636 also cuts the granule-coated sheet 628 into the continuous underlay sheet 702 and the continuous overlay sheet 704. As shown in FIG. 2, the continuous underlay sheet 702 is directed to be aligned beneath the continuous overlay sheet 704, and the two sheets 702, 704 are laminated together to form a continuous laminated sheet 650. As shown in FIG. 6, the continuous underlay sheet 702 is routed on a longer path than the path of the continuous overlay sheet 704. Further downstream, the continuous laminated sheet 650 is passed into contact with a rotary length cutter 644 that cuts the laminated sheet 650 into individual laminated shingles 652.

To facilitate synchronization of the cutting and laminating steps, various sensors and controls can be employed, as disclosed in U.S. Pat. No. 6,635,140 to Phillips et al. For example, one or more timing marks 720 (FIG. 7), as known in the art, may be applied to an appropriate part of the granule-coated sheet 628 to identify specific portions of the sheet. The timing may be sensed by one or more sensors 722 (FIGS. 6A and 6B), such as photoeyes, for synchronization with the rotating rotary patter cutter 636.

While the process for depositing reflectivity-increasing granules 501 onto the asphalt-coated sheet 220, 620 has been described as including reflectivity-increasing granules 501 only on the tab portion 110 of the overlay sheet 102 (FIGS. 1A and 1B) or only on the prime portions 134 of the underlay sheet 504 (FIGS. 5A and 5B), it will be understood that the two embodiments may be combined. For example, turning to FIGS. 1A, 1B, 5A, and 5B, reflectivity-increasing granules 130, 501 may be selectively applied to the tab portion 110, 510 of the overlay sheet 102, 502 and to the prime portions 136, 534 of the underlay sheet 104, 504. In such an embodiment, the reflectivity-increasing granules 130, 501 would at least partially cover the portions of the shingle 100, 500, which would be exposed when the shingle 100, 500 is secured in a roof covering system, and the reflectivity-increasing granules 130, 501 would not be disposed the covered portions 136, 536.

In other exemplary embodiments, the laminated shingle 100, 500 may not have increased infrared reflectivity properties and the granules 130, 501 with different physical properties, such as color, size, and luster (but optionally not increased infrared reflectivity) may be discretely applied to varying portions of the shingle 100, 500 to increase the visual aesthetics of the shingle 100, 500. The discrete application of varying granules, such as finer and coarser granules and/or colored and non-colored granules, on various portions of the shingle 100, 500 may provide enhanced visual aesthetics. For example, the laminated shingle 100, 500 may include granules 130, 501 on only one or both of the tab portion 110, 510 of the overlay sheet 102, 502 and the prime portions 136, 534 of the underlay sheet 104, 504 for aesthetic purposes. The granules 130, 501 which are discretely applied to increase the aesthetics of the shingle 100, 500 may be finer granules, colored, conventional granules, a mixture of finer granules and colored, conventional granules, or any of the preceding granule compositions mixed with colored, conventional granules 503

The shingle 100, 500 may achieve various visual aesthetics by distributing granules with various particle sizes and/or colors over the shingle 100, 500. In a preferred embodiment, the visual aesthetics of the shingle 100, 500 are improved by applying finer and coarser granules to the shingle 100, 500. For example, in one embodiment, granules finer than grade 11, such as finer than grade 15, such as grade 18, may be applied to the overlay sheet 102, 502 while conventional or grade 11 granules are applied to the underlay sheet 104, 504. In a second embodiment, granules finer than grade 11, such as finer than grade 15, such as grade 18, may be applied to the underlay sheet 104, 504 while conventional or grade 11 granules are applied to the overlay sheet 102, 502. In a third embodiment, a blended drop of both granules finer than grade 11, such as finer than grade 15, such as grade 18, and conventional or grade 11 granules may be applied to the overlay sheet 102, 502 and the underlay sheet 104, 504, such that the resultant appearance of the shingle 100, 500 is a combination of conventional or grade 11 granules and finer granules. While the exemplary laminated shingles 100, 500 have been described as having increased visual aesthetics through the use of applying finer and coarser granules to the shingle 100, 500 it will be appreciated that other granule combinations may be used to increase the visual aesthetics of the shingle 100, 500. For example, colored, cool granules may be applied instead of the finer granules and non-colored granules may be applied instead of the coarser granules, as described, to increase the aesthetics of the shingle 100, 500. Further, it will be appreciated that any combination or variation of granules, including finer and coarser granules and/or colored and non-colored granules, may be discretely applied to only one or both of the tab portion 110, 510 of the overlay sheet 102, 502 and the prime portions 136, 534 of the underlay sheet 104, 504 to increase the visual aesthetics of the shingle 100, 500.

Turning back to FIG. 6B, a second exemplary apparatus 610 for manufacturing a second exemplary embodiment of an asphalt-based roofing material is depicted. The illustrated manufacturing process is substantially similar to that of FIG. 6A and further includes a second coater 621 where, as will be described below in greater detail, a coating of hot melted reflectivity-increasing asphalt 623 is applied to the asphalt-coated sheet 620. As used in the description and the appended claims, the phrase "reflectivity-increasing asphalt" is defined as asphalt with a solar heat reflectance of at least about 9 percent and the phrase "conventional asphalt" is defined as colored asphalt with a solar heat reflectance of less than about 5 percent.

The reflectivity-increasing asphalt 623 may take a variety of forms. The reflectivity-increasing asphalt 623 may be any composition, color, density, consistency, or material, either asphalt or non-asphalt, that can reflect heat away from the shingle and/or reduce the amount of heat absorbed by the asphalt-based roofing material. In a preferred embodiment, the reflectivity-increasing asphalt 623 is a colored, non-black asphalt. As black absorbs the most heat, selecting a non-black asphalt decreases the amount of heat absorbed by the shingle and/or increases the amount of solar or infrared heat reflected from the shingle thereby increasing the solar reflective index. In an exemplary embodiment, the non-black reflectivity-increasing asphalt 623 is formed by mixing color additives with black hot mix asphalt or asphalt emulsion sealer to permanently change the color of the asphalt. In a further exemplary embodiment, the reflectivity-increasing asphalt 623 is white.

The shingle mat 610 passes through the first coater 618 where a coating of a first hot, melted asphalt 619 is applied to the shingle mat 612 to form an asphalt-coated sheet 620. The first hot, melted asphalt 619 is a conventional asphalt. The first coater 618 may apply the first hot, melted asphalt 619 to the entire shingle mat 612 or to only selectively portions of the shingle mat 612. For example, the first coater 618 may apply the first hot, melted asphalt 619 to completely cover the top and bottom surfaces of the shingle mat 612, to completely cover the bottom surface of the shingle mat 612 and select portions of the top surface of the shingle mat 612, or to completely cover only the bottom surface of the shingle mat 612. In a preferred embodiment, the first coater 618 applies the first hot, melted asphalt 619 to completely cover the top and bottom surfaces of the shingle mat 612.

The hot reflectivity-increasing asphalt coating 623 may be applied in any suitable manner by the second coater 621. In the illustrated embodiment, after the shingle mat 612 passes through the first coater 618 where the coating of a first hot, melted asphalt 619 is applied to the shingle mat 612 to form an asphalt-coated sheet 620, the asphalt-coated sheet 620 contacts at least one roller (not pictured) which is in contact with a supply of hot, melted reflectivity-increasing asphalt 623. The at least one roller at least partially covers a top surface of the asphalt-coated sheet 620 with a tacky coating of reflectivity-increasing asphalt 623. In a preferred embodiment, multiple rollers of varying widths or sizes are used may be used to apply the reflectivity-increasing asphalt 623 to various portions of the sheet 620 at varying widths, as will be described below in greater detail. However, in other embodiments, the reflectivity-increasing asphalt coating 623 could be sprayed on, rolled on, or applied to the sheet 620 by other means. In a preferred embodiment, the second coater 621 applies the coating of the reflectivity-increasing asphalt 623 to only selective portions of the top surface of the asphalt-coated sheet 620. In a first alternative embodiment, the second coater 621 applies the coating of the reflectively-increasing asphalt 623 to completely cover the top surface of the asphalt-coated sheet 620. In a second alternative embodiment, the second coater 621 applies the coating of the reflectivity-increasing asphalt 623 to completely cover the top and bottom surfaces of the asphalt-coated sheet 620. In a fourth alternative embodiment, the second coater 621 applies the coating of the reflectivity-increasing asphalt 623 to completely over the bottom surface of the asphalt-coated sheet 620 and selective portions of the top surface of the asphalt-coated sheet 620.

Typically, the reflectivity-increasing asphalt coating 623 is highly filled with a ground mineral filler and contains an additive such as various iron oxides, titanium dioxide and synthetic oxides which imparts increased solar reflectivity. Typical levels of the solar reflective additive range from about 2% to 10% by weight of the asphalt/filler combination, such as about 4% to 8% by weight of the asphalt filler combination, such as about 6% by weight of the asphalt filler combination. Typically, the asphalt coating is highly filled with a ground mineral filler material, amounting to at least about 42 percent by weight of the asphalt/filler combination. In one embodiment, the asphalt coating 619 is in a range from about 350 degrees Fahrenheit to about 400 degrees Fahrenheit. In another embodiment, the asphalt coating 619 may be more than 400 degrees Fahrenheit or less than 350 degrees Fahrenheit. The shingle mat 612 exits the coater 618 as an asphalt-coated sheet 620. The asphalt coating 619 on the asphalt-coated sheet 620 remains hot. The asphalt-coated sheet 620 includes a continuous underlay sheet portion 702 and a continuous overlay sheet portion 704, as best shown in FIG. 7 and described in detail below.

After the hot, melted reflectivity-increasing asphalt 623 has been applied to the asphalt-coated sheet 620, the sheet 620 is passed beneath the first granule applicator 622. In a preferred embodiment, the first granule applicator 622 applies colored, conventional granules. However, it will be appreciated that the first granule applicator 622 may apply any mixture of roofing granules. For example, the first granule applicator 622 may apply reflectivity-increasing granules in any variation and/or combination as described in reference to FIG. 6A. After the granules have been applied to the asphalt-coated sheet 620, the apparatus 610 for manufacturing a second exemplary embodiment of an asphalt based roofing material follows the same process for manufacturing an asphalt-based roofing material as the apparatus 610 depicted in FIG. 6A.

Figure 6B:
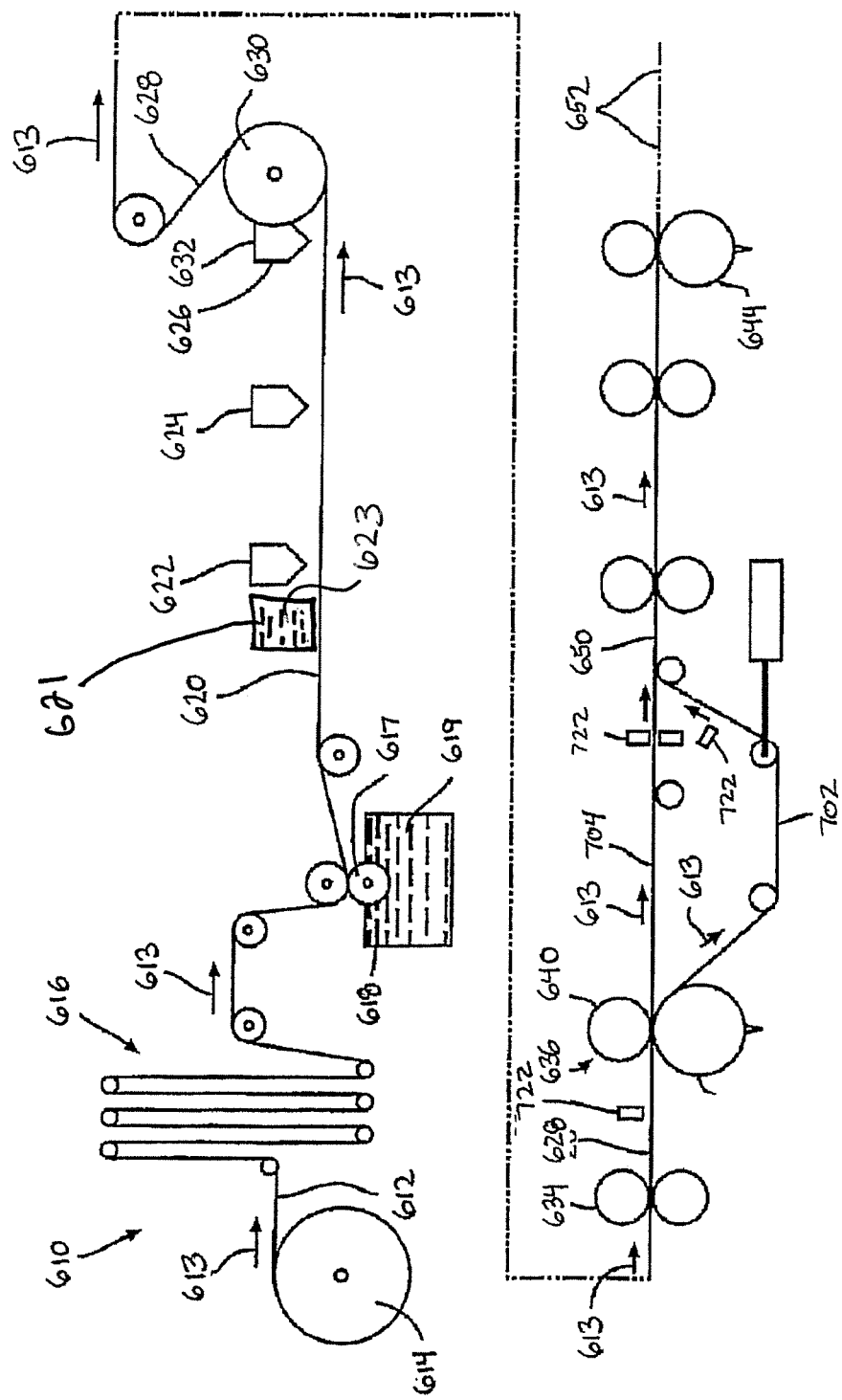
FIG. 6B is a schematic view in elevation of an exemplary embodiment of an apparatus for manufacturing an asphalt-based roofing material having a reflectivity-increasing asphalt layer.

While the apparatus 610 of FIG. 6B has been described as the same as the apparatus of FIG. 6A after the second coater 621, other embodiments are contemplated. For example, the apparatus 610 of FIG. 6A may include different apparatuses and processes for applying granules and may apply include different granule mixture. In a first alternative embodiment, the apparatus 610 applies only colored, conventional granules 503 to the asphalt-coated sheet 620. In a second alternative embodiment, the apparatus 610 does not include a third granule applicator 626. In a third alternative embodiment, the apparatus 610 includes neither a second or third granule applicator 624, 626. In the second and third alternative embodiments, the first granule applicator 622 and second granule applicator 624, where applicable, may apply any variety or combination of granule mixtures to the asphalt-coated sheet 620, including, but not limited to, only colored, conventional granules 503, only reflectivity-increasing granules 501, or a mixture of colored, conventional granules 503 and reflectivity-increasing granules 501.

Further, while the apparatus 610 for manufacturing a second exemplary embodiment of an asphalt based roofing material has been described as having a second coater 621 which coats the shingle mat 612 with the hot, melted reflectivity-increasing asphalt 623 on a previously deposited coating of a first hot, melted asphalt 619, it will be appreciated that other embodiments are contemplated. For example, the first coater 618 may apply the first hot, melted asphalt 619 to only the bottom surface of the shingle mat 612 and one or more portions of the top surface of the shingle mat 612 and the second coater 621 may apply a coating of hot, melted reflectivity-increasing asphalt 623 to the remaining one or more portions of the top surface of the shingle mat 612, as will be described below in more detail. Alternatively, the first coater 618 may apply the first hot, melted asphalt 619 to only the bottom surface of the shingle mat 612 and the second coater 621 may apply the coating of hot, melted reflectivity-increasing asphalt 623 to the top surface of the shingle mat 612. In a further alternative embodiment, instead of providing first and second coaters 618, 620, the first coater 618 may apply the reflectivity-increasing asphalt 623 to the shingle mat 612 to form the asphalt-coated sheet 620.

Turning to FIGS. 6C and 6D, cross-sectional portions of first and second exemplary granule-coated sheets 628 produced by the apparatus 610 of FIG. 6B are depicted. The exemplary granule-coated sheets 628 include the shingle mat 612 (depicted by the X cross-hatching), the first asphalt 619 (depicted by the angled cross-hatching) at least on the bottom of the shingle mat 612, the reflectivity-increasing asphalt coating 623 (depicted by the vertical cross-hatching) disposed above the shingle mat 612, and roofing granules 501, 503 disposed on top of the reflectivity-increasing asphalt coating 623. Depending on the portion of the granule-coated sheet 628, the granules may be first blend drop granules containing reflectivity-increasing granules 501 and/or conventional granules 503, as described above.

In FIG. 6C, the granule-coated sheet 628 includes a coating of the first hot, melted asphalt 619 on the top and bottom surfaces of the shingle mat 612. The reflectivity-increasing asphalt coating 623 is disposed on top of the coating of first hot, melted asphalt 619 that is on the top surface of the shingle mat 619. The granules 501, 503 are applied to the top surface of the reflectivity-increasing asphalt coating 623. The granules 501, 503 are then pressed or otherwise embedded into the reflectivity-increasing asphalt 623 and, depending on the thickness of the reflectivity-increasing asphalt 623, may be at least partially pressed or otherwise embedded into the first hot, melted asphalt coating 619. In a preferred embodiment, the granule-coated sheet 628 is produced from the apparatus 610 depicted in FIG. 6B for producing a second exemplary embodiment of an asphalt based roofing material, where a shingle mat 612 is passed through a first coater 618 where the coating of hot, melted asphalt 619 is applied to the shingle mat 612 to form an asphalt coated sheet 620 which is then passed through the second coater 620 where a coating of hot, melted reflectivity-increasing asphalt 623 is applied to the top surface of the asphalt-coated sheet 620.

In FIG. 6D, the granule-coated sheet 628 includes a coating of the first hot, melted asphalt 619 on the bottom surface of the shingle mat 612, a coating of the reflectivity-increasing asphalt 623 on the top surface of the shingle mat 612, and granules 501, 503 applied to the top surface of the reflectivity-increasing asphalt 623. In a preferred embodiment, the granule-coated sheet 628 is produced from the alternative embodiment of the apparatus 610 of FIG. 6B where the first coater 618 applies a coating of hot, melted asphalt 619 to only one or more portions of the shingle mat 612 and the second coater 620 applies the coating of hot, melted reflectivity-increasing asphalt 623 to the remaining one or more portions of the shingle mat 612. The granule-coated sheet 628 may be produced from the alternative apparatus 610 of FIG. 6B where the first coater 618 applies a coating of hot, melted asphalt 619 to only the bottom surface of the shingle mat 612 or the alternative apparatus 610 where the first coater 618 applies a coating of hot, melted asphalt 619 to the bottom surface and one or more portions of the top surface of the shingle mat 612.

While the granule-coated sheets 628 of FIGS. 6C and 6D have been described as including first hot, melted asphalt 619 on at least the bottom surface of the shingle mat 612 and reflectivity-increasing asphalt 623 on or above the top surface of the shingle mat 612, it will be appreciated that other embodiments are contemplated. For example, the granule-coated sheet 628 may include only reflectivity-increasing asphalt 623 on the top and bottom surfaces of the shingle mat 612 or may include layers of the first hot, melted asphalt 619 on the top and bottom surfaces of the shingle mat 612, a layer of the reflectivity-increasing asphalt 623 disposed on top of the top layer of first hot, melted asphalt 619, and a layer of the reflectivity-increasing asphalt 623 disposed on the bottom of bottom layer of first hot, melted asphalt 619.

Figure 8B:
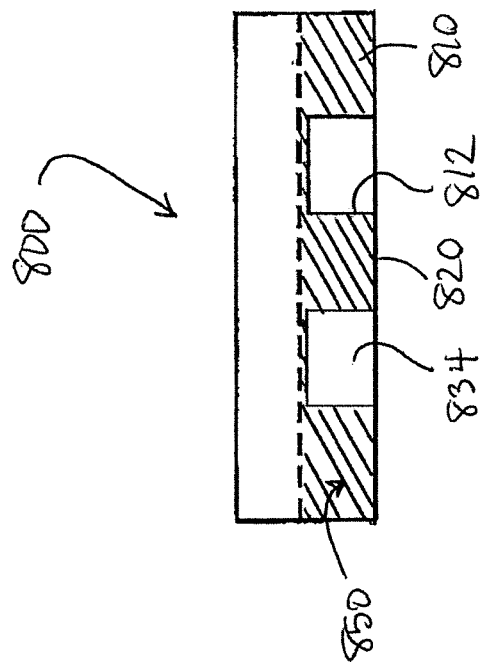
FIG. 8B is a schematic plan view of the laminated shingle illustrated in FIG. 8A.
Figure 8A:
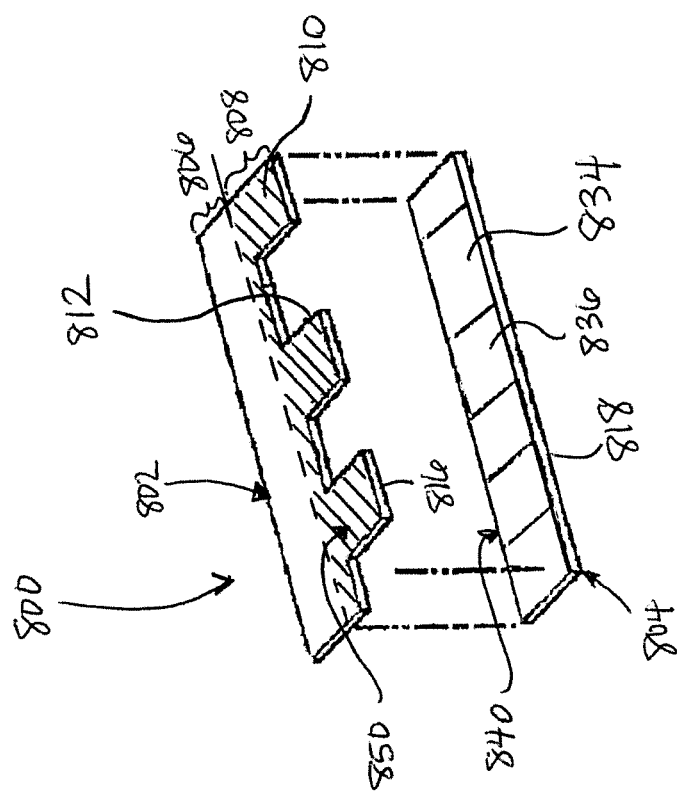
FIG. 8A is an exploded schematic perspective view of a first exemplary embodiment of a laminated shingle having a reflectivity-increasing asphalt.

Turning to FIGS. 8A through 9C, in an additional exemplary embodiment of an asphalt-based roofing material having increased infrared-reflective properties, the roofing material may have a reflectivity-increasing asphalt layer 850, as shown by the crosshatching. FIGS. 8A through 8F illustrate three exemplary embodiments of an asphalt-based roofing material in the form of a laminated shingle 800. FIGS. 8A and 8B illustrate a first exemplary embodiment of an asphalt-based roofing material, FIGS. 8C and 8D illustrate a second exemplary embodiment of an asphalt-based roofing material, and FIGS. 8E and 8F illustrate a third exemplary embodiment of an asphalt-based roofing material, each in the form of a laminated shingle 800. Although FIGS. 8A through 8F illustrate an exemplary embodiment of a laminated shingle, it will be understood that the apparatus utilizing the reflectivity-increasing asphalt 850 may be used with other asphalt-based roofing materials, such as for example, single layer shingles (e.g., three-tab shingles).

The laminated shingle 800 is similar to the laminated shingle 100 of FIGS. 1A and 1B in that the laminated shingle 800 may include an overlay sheet 802 and an underlay sheet 804. The overlay sheet 802 includes an upper or headlap portion 806, and a lower prime or butt portion 808. The butt portion 808 includes a repeated pattern of the tabs 810 and cutouts 812. A rear surface of the overlay sheet 802 and a front surface of the underlay sheet 804 are fixedly attached to each other to form the laminated shingle 800. Such attachment can be accomplished by using adhesive materials applied to the rear surface of the overlay sheet 802 and the front surface of the underlay sheet 804. In the illustrated embodiment, a butt edge 816 of the butt portion 808 of the overlay sheet 802 and a lower edge 818 of the underlay sheet 804 are vertically aligned to define a lower edge 820 of the shingle 800. If desired, a bead of adhesive (not shown) may be applied to a bottom surface of the underlay sheet 504. Additionally, the underlay layer 802 may have an edge 840 (the upper edge when viewing FIGS. 8A, 8C, 8E) and, as described above relating to FIGS. 1A and 1B and FIGS. 5A and 5B, the laminated shingle 800 may also include a shadow edge (not pictured) formed along the edge 840.

Similarly to the laminated shingle 100 of FIGS. 1A and 1B, the laminated shingle 800 also has a prime portion 834 of the underlay sheet 804 and a covered portion 836 of the underlay sheet 804. The prime portion 834 of the underlay sheet 804 is positioned between the tabs 810 of the overlay sheet 802 when the overlay sheet 802 and underlay sheet 804 are assembled. The covered portion 836 of the underlay sheet 804 refers to the portion that will be underneath the tabs 810 of the overlay sheet 802 when the overlay sheet 802 and underlay sheet 804 are assembled, and will not be visible in the finished laminated shingle 800.

In the illustrated embodiments of FIGS. 8A-8F, the laminated shingle 800 includes reflectivity-increasing asphalt 850 selectively applied to only a portion of the laminated shingle 800. The reflectivity-increasing asphalt 850 may take a variety of forms. The reflectivity-increasing asphalt 850 may be any composition, color, density, consistency, or material, either asphalt or non-asphalt, that can reflect heat away from the shingle and/or reduce the amount of heat absorbed by the shingle 800. The reflectivity-increasing asphalt 850 may be applied to any desired portion of the shingle 800. As described above, in a preferred embodiment, the reflectivity-increasing asphalt 850 is a non-black asphalt selectively applied to only a portion of the laminated shingle 800.

In the illustrated embodiment of FIGS. 8A and 8B, the reflectivity-increasing asphalt 850 is selectively applied only to the butt portion 808 of the overlay sheet 802, while the headlap portion 806 of the overlay sheet 802 and both the prime and covered portions 834, 836 of the underlay sheet 804 are coated only in conventional asphalt. As described, the reflectivity-increasing asphalt 850 may be applied to the butt portion 808 of the overlay sheet 802 either on top of a layer of conventional asphalt or instead of the conventional asphalt. In a preferred embodiment, the reflectivity-increasing asphalt 850 is applied to the butt portion 808 over a layer of conventional asphalt. In an alternative embodiment, the reflectivity-increasing asphalt 850 may be selectively applied to only the tab portion 810 of the overlay sheet 802 instead of the butt portion 808 of the overlay sheet 802.

Figure 8D:
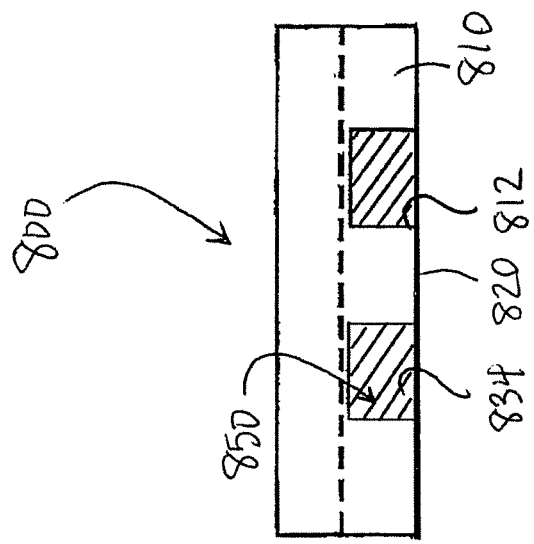
FIG. 8D is a schematic plan view of the laminated shingle illustrated in FIG. 8C.
Figure 8C:
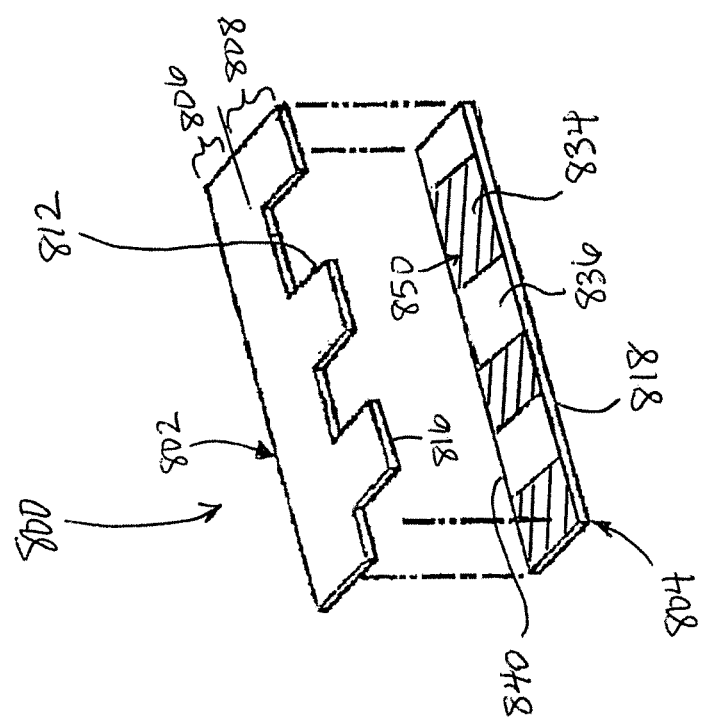
FIG. 8C is an exploded schematic perspective view of a second exemplary embodiment of a laminated shingle having a reflectivity-increasing asphalt.

In the illustrated embodiment of FIGS. 8C and 8D, the reflectivity-increasing asphalt 850 is selectively applied only to the prime portion 834 of the underlay sheet 804, while the covered portion 836 of the underlay sheet 804 and both the headlap and butt portions 806, 808 of the overlay sheet 802 are coated in conventional asphalt. The reflectivity-increasing asphalt 850 may be applied to the prime portion 834 of the underlay sheet 804 either on top of a layer of conventional asphalt or instead of the conventional asphalt. In a preferred embodiment, the reflectivity-increasing asphalt 850 is applied to the prime portion 834 over a layer of conventional asphalt.

Figure 8F:
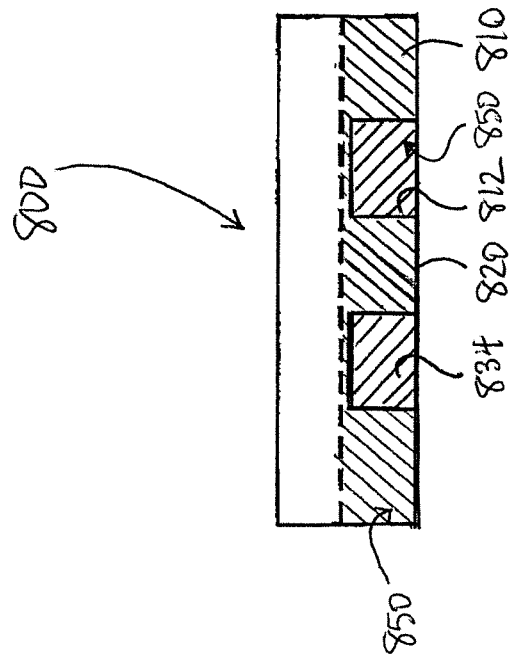
FIG. 8F is a schematic plan view of the laminated shingle illustrated in FIG. 8E.
Figure 8E:
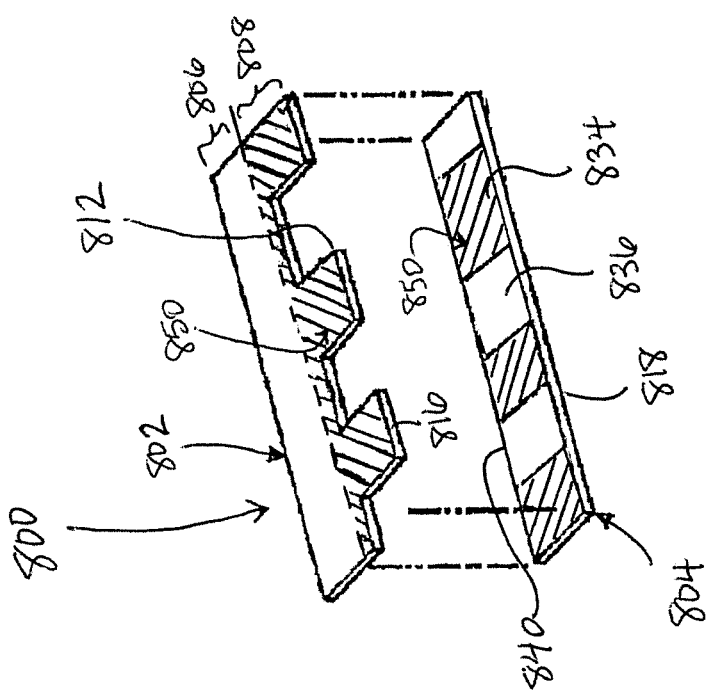
FIG. 8E is an exploded schematic perspective view of a third exemplary embodiment of a laminated shingle having a reflectivity-increasing asphalt.

In the illustrated embodiment of FIGS. 8E and 8F, the reflectivity-increasing asphalt 850 is selectively applied only to the butt portion 808 of the overlay sheet 802 and the prime portion 834 of the underlay sheet 804, while the headlap portion 806 of the overlay sheet 802 and the covered portion 836 of the underlay sheet 804 are coated in conventional asphalt. The reflectivity-increasing asphalt 850 may be applied to the butt portion 808 of the overlay sheet 802 and the prime portion 834 of the underlay sheet 804 on top of a layer of conventional asphalt or instead of the conventional asphalt, either separately or in combination. For example, the reflectivity-increasing asphalt 850 may be applied on top of a layer of conventional asphalt for the prime portion 834 of the underlay sheet 804 and instead of a conventional asphalt for the butt portion 808 of the overlay sheet 802. In a preferred embodiment, a layer of reflectivity-increasing asphalt 850 is applied to the butt portion 808 and the prime portion 834 over a layer of conventional asphalt. In an alternative embodiment, the reflectivity-increasing asphalt 850 may be selectively applied to the prime portion 834 of the underlay sheet 804 and only the tab portion 810 of the overlay sheet 802 instead of the butt portion 808 of the overlay sheet 802.

Further, any of the laminated shingles 800 illustrated in FIGS. 8A through 8F may also include reflectivity-increasing granules selectively applied to any desired portion of the shingle 800. In one example, the laminated shingle 800 may have reflectivity-increasing asphalt 850 on the butt portion 808 and reflectivity-increasing granules on the butt portion 808 and/or the prime portion 834. In an additional example, the laminated shingle 800 may have reflectivity-increasing asphalt 850 on the prime portion 834 and reflectivity-increasing granules on the butt portion 808 and/or the prime portion 834. In a further example, the laminated shingle 800 may have reflectivity-increasing asphalt 850 on the butt portion 808 and the prime portion 834 and reflectivity-increasing granules on the butt portion 808 and/or the prime portion 834.

Referring to FIGS. 8A through 9C, the laminated shingle 800 may be produced from a continuous sheet 920 (FIGS. 9A-9C) according to the methods discussed above with the additional step of applying the reflectivity-increasing asphalt 850 to the continuous sheet 920 and/or laminated shingle 800. In a preferred embodiment, the reflectivity-increasing asphalt 850 is selectively applied to the continuous sheet 920 before the continuous sheet 920 is cut and assembled into the laminated shingle 800. In a further preferred embodiment, the reflectivity-increasing asphalt 850 is selectively applied to the continuous sheet 920 after the sheet 920 has been coated with hot, melted conventional asphalt and before the sheet 920 passes beneath a granule applicator where granules are deposited onto the sheet 920. The reflectivity-increasing asphalt 850 may be applied to the continuous sheet 920 via an asphalt bath, one or more rollers, one or more sprayers or nozzles, or any other mechanism or method known in the art to deposit or apply asphalt.

Figure 9A:
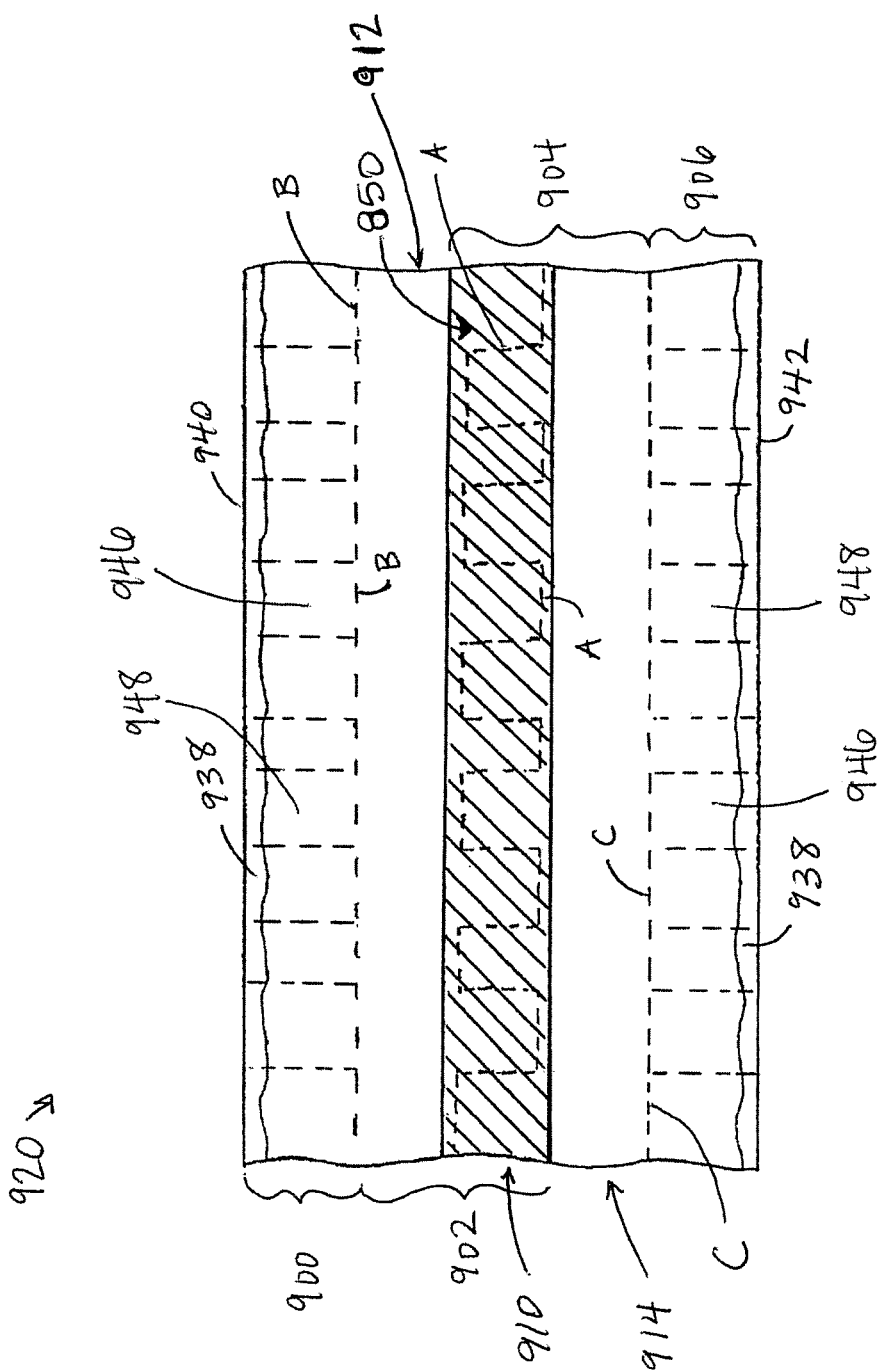
FIG. 9A is a plan view of a portion of a first asphalt coated sheet produced by the apparatus of FIG. 6B.
Figure 9B:
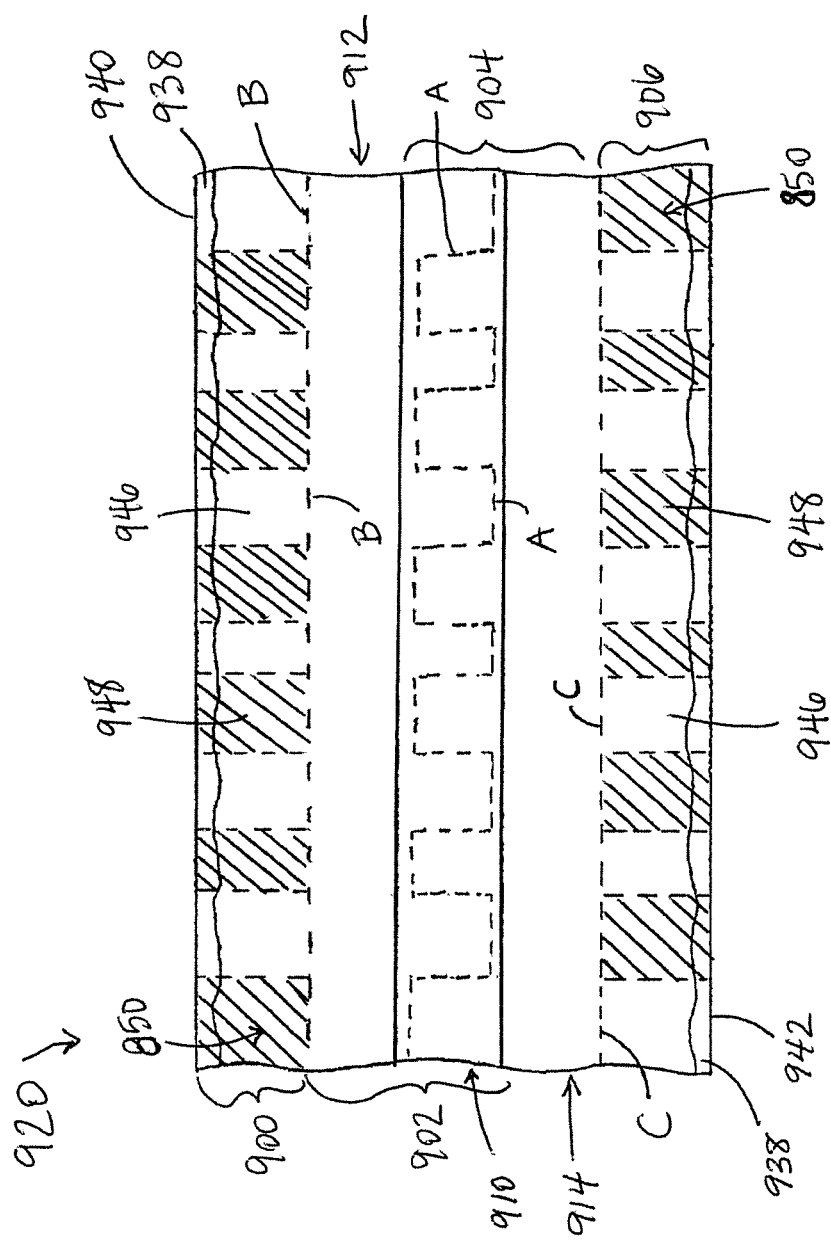
FIG. 9B is a plan view of a portion of a second asphalt coated sheet produced by the apparatus of FIG. 6B.
Figure 9C:
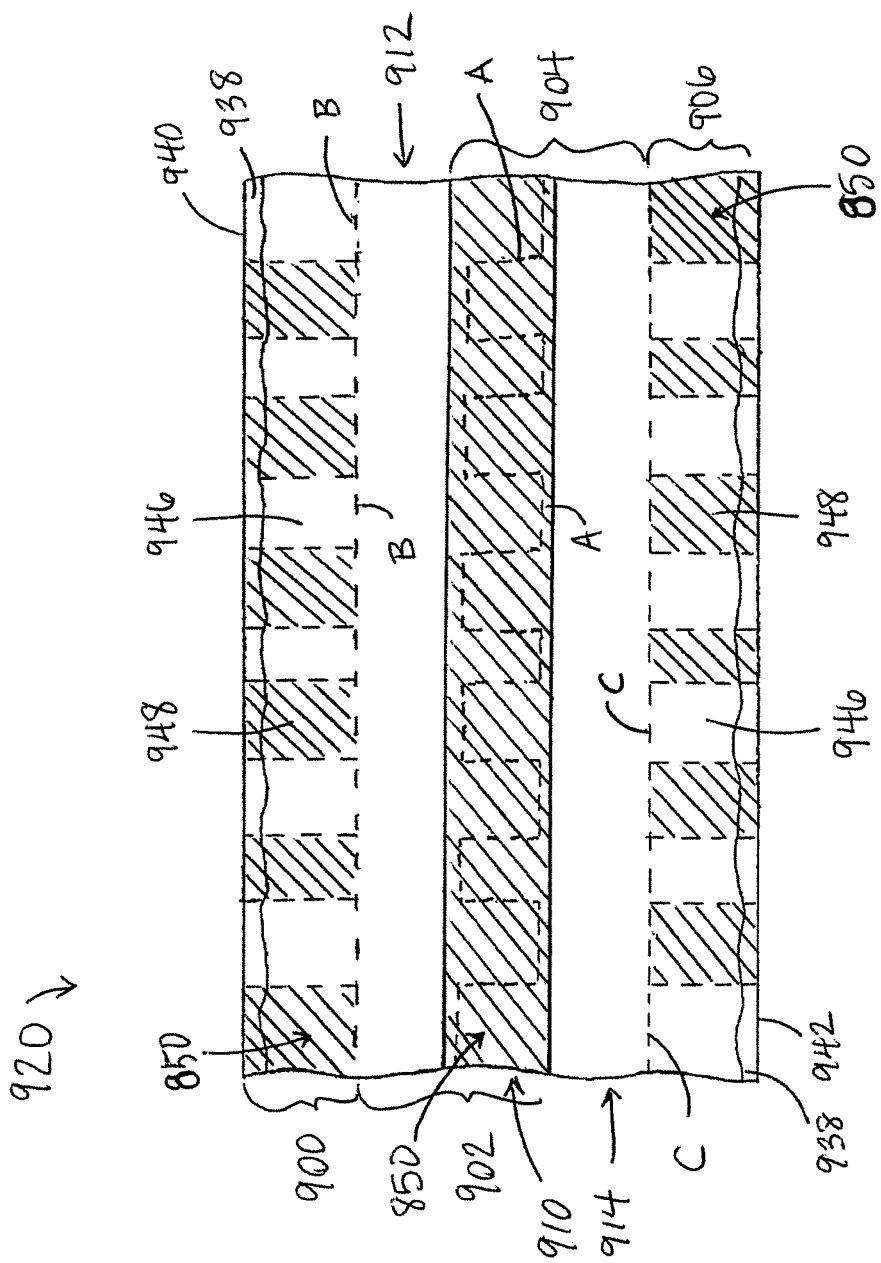
FIG. 9C is a plan view of a portion of a third asphalt coated sheet produced by the apparatus of FIG. 6B.

FIGS. 9A through 9C illustrate exemplary embodiments of an asphalt-coated sheet 920 for producing a laminated shingle having a reflectivity-increasing asphalt. The asphalt-coated sheet 920 is similar to the asphalt-coated sheet 220 of FIGS. 2 and 3 in that the asphalt-coated sheet 920 may include a first continuous underlay sheet portion 900, a first continuous overlay sheet portion 902, a second continuous overlay sheet portion 904, and a second continuous overlay sheet portion 906. The first continuous overlay sheet portion 902 includes a continuous tab sheet portion 910 and a first continuous headlap sheet portion 912. The second continuous overlay sheet portion 904 includes a second continuous headlap portion 912 and shares the first continuous headlap sheet portion 912 with the first continuous overlay sheet portion 902. The continuous sheet 920 may further include an upper edge 940 and a lower edge 942 (the upper edge and lower edge when viewing FIGS. 9A-C).

As described above, the asphalt-coated sheet 920 will be fed through a rotary pattern cutter (not pictured) which will cut a repeated pattern of tabs and cutouts through the tab sheet portion 910, as shown by the dashed line A. The pattern cutter will also cut the asphalt-coated sheet 920 to separate the first continuous underlay sheet 900 from the first overlay sheet portion 902 and to separate the second continuous underlay sheet portion 906 from the second overlay sheet portion 904, as shown by the dashed line B and C, respectively. Once the sheet 920 cut, the portion between edge 940 and dashed line B may become the underlay sheet of a first shingle, the portion between dashed lines B and A may become the overlay sheet of the first shingle, the portion between dashed lines A and C may become the overlay sheet of a second shingle, and the portion between dashed line C and edge may become the underlay sheet of the second shingle. The cut along dashed line A will make the tabs and cutouts of the overlay sheets, with the tabs of the first shingle corresponding to the cutouts of the second shingle and vice-versa.

The continuous underlay sheet portions 900, 906 of the asphalt-coated sheet 920 may further include covered areas 946 and prime areas 948 in alternating arrangement along the length of the edges 940, 942. In a preferred embodiment, the covered and prime areas 946, 948 of the first continuous underlay sheet portion 900 are opposite in arrangement compared to the covered and prime areas 946, 948 of the second continuous underlay sheet portion 906. In a further preferred embodiment, for each continuous underlay sheet portion 900, 906, the covered areas 946 are aligned with the corresponding tabs defined by dashed line A of the continuous tab sheet portion 910 and the prime areas 948 are aligned with the corresponding cutouts defined by dashed line A. For example, for the first continuous underlay sheet portion 900 the covered area 946 will be spaced correspondingly to where dashed line A is closest to edge 942 and the prime areas 948 will be spaced correspondingly to where dashed line A is closest to edge 948, and the opposite will be true for the covered and prime areas 946, 948 of the second continuous underlay layer 906.

Referring to FIGS. 8A through 9C, in an exemplary embodiment, after the continuous sheet 920 is cut and assembled into the laminated shingle 800, the covered areas 946 of the sheet 920 will become the covered regions 836 (FIGS. 8A, 8C, and 8E) of the shingle 800 and the prime areas 948 of the continuous sheet 920 will become the prime regions 834 (FIGS. 8A-8F) of the shingle 800. For example, both edges 940, 942 may become an upper edge (shown as edge 840 in FIGS. 8A, 8C, and 8E) of an underlay sheet of a shingle.

Referring to FIG. 9A, the reflectivity-increasing asphalt 850 is selectively applied to the continuous sheet 920 in continuous tab sheet portion 910 between the first and second continuous headlap sheet portion 912, 914. After the reflectivity-increasing asphalt 850 is selectively applied to the asphalt-coated sheet 920, granules are applied to the sheet 920, the sheet 920 is cut, and the pieces are assembled into a laminated shingle as described above. In such a configuration, the resulting laminated shingle will have reflectivity-increasing asphalt 850 on the exposed butt portion of the shingle 800 (FIGS. 8A-8B).

Turning to FIG. 9B, the reflectivity-increasing asphalt 850 is selectively applied to the prime areas 948 of the continuous underlay sheet portions 900, 906. After the reflectivity-increasing asphalt 850 is selectively applied to the asphalt-coated sheet 920, granules are applied to the sheet 920, the sheet 920 is cut, and the pieces are assembled into a laminated shingle as described above. In such a configuration, the resulting laminated shingle will have reflectivity-increasing asphalt 850 on the exposed prime portions of the underlay (FIGS. 8C-8D).

Turning to FIG. 9C, the reflectivity-increasing asphalt 850 is applied to the continuous tab sheet portion 910 and the prime areas 948 of the continuous underlay sheet portions 900, 906. After the reflectivity-increasing asphalt 850 is selectively applied to the asphalt-coated sheet 920, granules are applied to the sheet 920, the sheet 920 is cut, and the pieces are assembled into a laminated shingle as described above. In such a configuration, the resulting laminated shingle will have reflectivity-increasing asphalt 850 on the butt portions of the overlay and the prime portions of the underlay, which are the portions of the laminated shingle that will be exposed when the shingle is placed on a roof (FIGS. 8E-8F).

While the reflectivity-increasing asphalt 850 has been described as being selectively applied to the continuous sheet 920 before the sheet 920 is cut and assembled into the laminated shingle 800, other methods of depositing or otherwise applying the reflectivity-increasing asphalt 850 are considered. For example, the reflectivity-increasing asphalt 850 may be applied to the sheet 920 or shingle 800 in lieu of the conventional asphalt in the locations indicated, the reflectivity-increasing asphalt 850 may be applied to the sheet 920 after the granules have been applied, or the reflectivity-increasing asphalt 850 may be applied to the shingle 800 after the shingle 800 has been assembled.

In other exemplary embodiments, the laminated shingle 800 may not have increased infrared reflectivity properties and the asphalt 850 with different physical properties, such as texture, color, and luster (but optionally not increased infrared reflectivity) may be discretely applied to varying portions of the shingle 800 to increase the visual aesthetics of the shingle 800. The discrete application of varying asphalts, such as different colored asphalts, on various portions of the shingle 800 may provide enhanced visual aesthetics. For example, the laminated shingle 800 may include asphalt 850 on only one or both of the tab portion 810 of the overlay sheet 802 and the prime portions 834 of the underlay sheet 804 for aesthetic purposes. The asphalt or asphalts 850 which are discretely applied to increase the aesthetics of the shingle 800 may be any composition, color, density, consistency, or material, or combination thereof.

The shingle 800 may achieve various visual aesthetics through selectively applying asphalts to various portions of the shingle 800. In a preferred embodiment, the visual aesthetics of the shingle 800 are improved by applying asphalt 850 to portions of the shingle 800 and conventional asphalt to other portions of the shingle 800. For example, in one embodiment, asphalt 850 may be applied to the overlay sheet 802 while conventional asphalt is applied to the underlay sheet 804. In a second embodiment, asphalt 850 may be applied to the underlay sheet 804 while conventional asphalt is applied to the overlay sheet 802. In a third embodiment, a combination of asphalt 850 and conventional asphalt may be applied to the overlay sheet 802 and/or the underlay sheet 804, such that the resultant appearance of the shingle 802 is a combination of asphalt 850 and conventional asphalt. While the exemplary laminated shingles 800 have been described as having increased visual aesthetics through applying asphalt 850 and conventional asphalt to discrete portions of the shingle 800, it will be appreciated that other asphalt combinations may be used. For example, various mixtures of asphalt 850 and conventional asphalt may be applied at varying portions of the shingle 800 to provide color or other visual gradients on only one or both of the tab portion 810 of the overlay sheet 802 and the prime portions 834 of the underlay sheet 804 to increase the visual aesthetics of the shingle 800. Further, it will be appreciated that the visual aesthetics of the shingle 800 may be increased by selectively applying various asphalts to the shingle 800 and discretely applying any variation or combination of granules to the shingle 800 as described above.

Several exemplary embodiments of shingles have been described. Any combination or sub-combination of the described shingle features, may be combined to form a shingle. While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A laminated roofing shingle, comprising:
   an overlay sheet having a top surface and a bottom surface opposite the top surface, the overlay sheet including a headlap portion and a butt portion, the butt portion defining a series of tabs and cutouts;
   an underlay sheet having a top surface attached to the bottom surface of the butt portion of the overlay sheet, the underlay sheet including a covered portion positioned beneath the tabs of the overlay sheet and a prime portion positioned beneath the cutouts;
   a layer of colored granules, including reflectivity-increasing granules, applied to a portion of the shingle at a location, designed to be exposed when installed in a roof covering system, selected from the group consisting of the tabs of the overlay sheet or the prime portion of the underlay sheet.

2. The laminated roofing shingle of claim 1 wherein the layer of reflectivity-increasing granules are colored, infrared-reflective granules.

3. The laminated roofing shingle of claim 1 wherein the layer of colored granules, including reflectivity-increasing granules, are only positioned on the tabs of the overlay sheet.

4. The laminated roofing shingle of claim 1 wherein the layer of colored granules, including reflectivity-increasing granules, are only positioned on the prime portion of the underlay sheet.

5. The laminated roofing shingle of claim 1 wherein the reflectivity-increasing granules have an infrared reflectance of at least 21%.

6. The laminated roofing shingle of claim 1 wherein the layer of colored granules, including reflectivity-increasing granules, comprises a mixture of colored, infrared reflective granules having an infrared reflectance of at least 21% and colored granules having an infrared reflectance of less than 25%.

7. The laminated roofing shingle of claim 1 wherein the layer of colored granules, including reflectivity-increasing granules, are positioned on only one of the tabs of the overlay sheet and the prime portion of the underlay sheet, and wherein the reflectivity-increasing granules have an infrared reflectance of at least 25%, and wherein colored granules having an infrared reflectance of less than 25% are positioned on the other of the tabs of the overlay sheet and the prime portion of the underlay sheet.

8. The laminated roofing shingle of claim 1 wherein the reflectivity-increasing granules are finer than grade 11.

9. The laminated roofing shingle of claim 1 wherein the reflectivity-increasing granules are grade 18.

10. A laminated roofing shingle, comprising:
an overlay sheet having a top surface and a bottom surface opposite the top surface, the overlay sheet including a headlap portion and a butt portion, the butt portion defining a series of tabs and cutouts;
an underlay sheet having a top surface attached to the bottom surface of the butt portion of the overlay sheet, the underlay sheet including a covered portion positioned beneath the tabs of the overlay sheet and a prime portion positioned beneath the cutouts;
a layer of reflectivity-increasing asphalt, applied to a portion of the shingle at a location, designed to be exposed when installed in a roof covering system, selected from the group consisting of the tabs of the overlay sheet or the prime portion of the underlay sheet.

11. The laminated roofing shingle of claim 10 wherein the reflectivity-increasing asphalt is only positioned on the butt portion of the overlay sheet.

12. The laminated roofing shingle of claim 10 wherein the reflectivity-increasing asphalt is only positioned on the prime portion of the underlay sheet.

13. The laminated roofing shingle of claim 10 wherein the reflectivity-increasing asphalt is only positioned on the butt portion of the overlay sheet and the prime portion of the underlay sheet.

14. The laminated roofing shingle of claim 10 wherein the reflectivity-increasing asphalt is a non-black asphalt.

15. The laminated roofing shingle of claim 10 wherein the reflectivity-increasing asphalt is white.

16. A method for manufacturing a laminated roofing shingle, comprising:
forming an asphalt-coated sheet having a top side, an overlay sheet portion, and an underlay sheet portion, the overlay sheet portion having a tab sheet portion and a headlap portion, the underlay sheet having a prime sheet portion and a covered sheet portion;
applying colored granules, including reflectivity-increasing granules, to a portion of the shingle at a location, designed to be exposed when installed in a roof covering system, selected from the group consisting of the tabs of the overlay sheet or the prime portion of the underlay sheet.

17. The method of claim 16, wherein the reflectivity-increasing granules are applied only to the top side of the tab sheet portion of the overlay sheet portion.

18. The method of claim 16, wherein the reflectivity-increasing granule are applied only to the top side of the prime portion of the underlay sheet portion.

19. The method of claim 16, wherein the reflectivity-increasing granules have an infrared reflectance of at least 21%.

20. The method of claim 16, wherein the reflectivity-increasing granules are applied only to one of the tab sheet portion of the overlay sheet portion or the prime portion of the underlay sheet portion, and wherein the method further comprises applying colored granules having an infrared reflectance of less than 25% to the other of the tab sheet portion of the overlay sheet portion or the prime portion of the underlay sheet portion.

* * * * *